United States Patent
Homma et al.

(10) Patent No.: US 10,048,577 B2
(45) Date of Patent: *Aug. 14, 2018

(54) IMAGING APPARATUS HAVING TWO IMAGING UNITS FOR DISPLAYING SYNTHESIZED IMAGE DATA

(71) Applicant: Olympus Corporation, Shibuya-ku, Tokyo (JP)

(72) Inventors: Shinsuke Homma, Hachioji (JP); Hiroshi Kodama, Hachioji (JP); Ryosuke Mochizuki, Hino (JP)

(73) Assignee: Olympus Corporation, Tokyo (JP)

( * ) Notice: Subject to any disclaimer, the term of this patent is extended or adjusted under 35 U.S.C. 154(b) by 195 days.

This patent is subject to a terminal disclaimer.

(21) Appl. No.: 14/797,673

(22) Filed: Jul. 13, 2015

(65) Prior Publication Data

US 2015/0319350 A1 Nov. 5, 2015

Related U.S. Application Data

(63) Continuation of application No. 12/949,330, filed on Nov. 18, 2010, now Pat. No. 9,110,365.

(30) Foreign Application Priority Data

Nov. 19, 2009 (JP) ................................. 2009-264303
Nov. 25, 2009 (JP) ................................. 2009-268087

(51) Int. Cl.
| | | |
|---|---|---|
| G01V 3/28 | (2006.01) |
| G01V 13/00 | (2006.01) |
| G03B 37/00 | (2006.01) |
| G03B 17/02 | (2006.01) |
| G03B 19/07 | (2006.01) |
| H04N 5/225 | (2006.01) |
| H04N 5/232 | (2006.01) |

(52) U.S. Cl.
CPC ............. *G03B 37/00* (2013.01); *G03B 17/02* (2013.01); *G03B 19/07* (2013.01); *H04N 5/2259* (2013.01); *H04N 5/232* (2013.01)

(58) Field of Classification Search
CPC ...... H04N 5/2259; H04N 5/232; H04N 5/225; G03B 17/02; G03B 19/07; G03B 37/00
USPC .......................................................... 348/36
See application file for complete search history.

(56) References Cited

U.S. PATENT DOCUMENTS 5,495,576 A * 2/1996 Ritchey .................. G06T 17/00
                                                        345/420
7,515,194 B2 * 4/2009 Nagata ................. G02B 13/007
                                                        348/335

(Continued)

*Primary Examiner* — Jay Patel
*Assistant Examiner* — Salame Amr
(74) *Attorney, Agent, or Firm* — John C. Pokotylo; Pokotylo Patent Services

(57) ABSTRACT

An imaging apparatus includes an omnidirectional imaging unit that captures and generates an image of a visual field all around an axis as omnidirectional image data; an image converter that converts at least a part of the omnidirectional image data, which is generated by the omnidirectional imaging unit, to image data having a rectangular display area and thereby generates conversion image data; and a display unit that displays an image corresponding to the conversion image data, which is generated by the image converter. The omnidirectional image data forms an annular shape.

9 Claims, 31 Drawing Sheets

(56) References Cited

U.S. PATENT DOCUMENTS

| | | | |
|---|---|---|---|
| 2005/0046702 A1* | 3/2005 | Katayama | G06T 15/205 |
| | | | 348/222.1 |
| 2005/0276448 A1* | 12/2005 | Pryor | B60K 35/00 |
| | | | 382/103 |
| 2007/0064143 A1* | 3/2007 | Soler | G02B 13/06 |
| | | | 348/335 |
| 2007/0188493 A1* | 8/2007 | Kondo | H04N 21/21805 |
| | | | 345/427 |
| 2008/0225538 A1* | 9/2008 | Lynam | B60K 35/00 |
| | | | 362/494 |
| 2009/0141022 A1* | 6/2009 | Kimpe | H04N 9/07 |
| | | | 345/419 |
| 2010/0317919 A1* | 12/2010 | Takaoka | A61B 1/00057 |
| | | | 600/104 |

\* cited by examiner

FIG.18
(a)
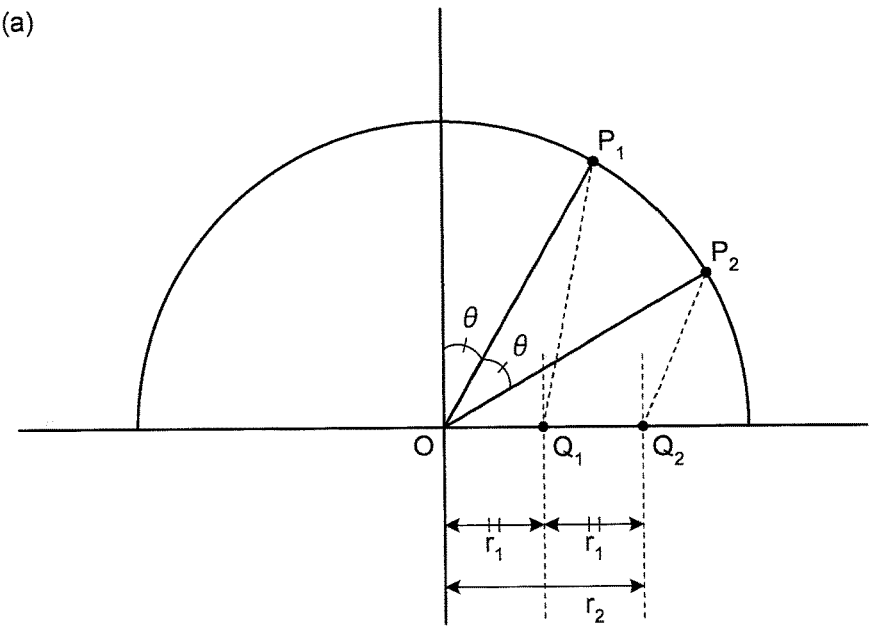
(b)
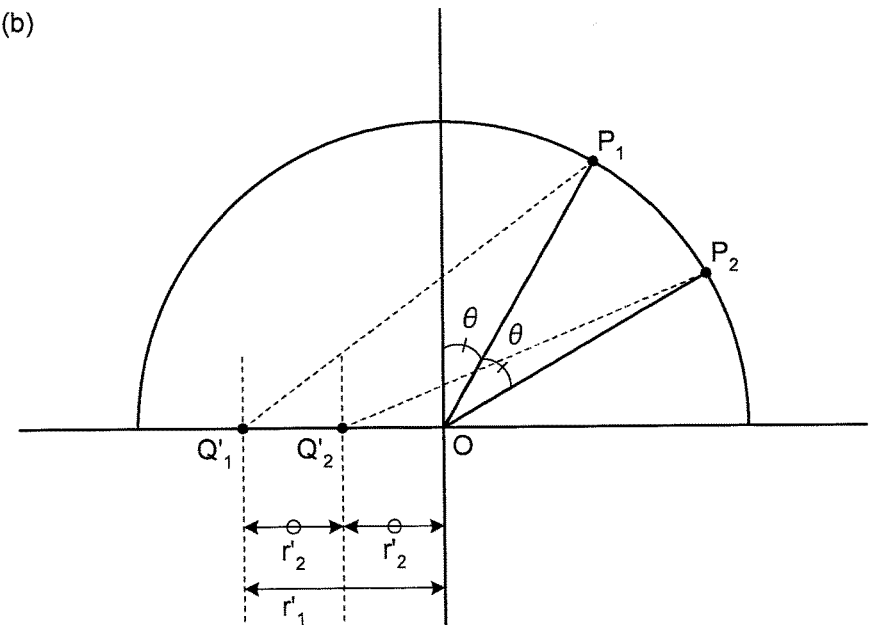

IMAGING APPARATUS HAVING TWO IMAGING UNITS FOR DISPLAYING SYNTHESIZED IMAGE DATA

CROSS-REFERENCE TO RELATED APPLICATIONS

This application is a continuation of U.S. patent application Ser. No. 12/949,330 (referred to as "the '330 application" and incorporated herein by reference), titled "IMAGING APPARATUS," filed on Nov. 18, 2010, and listing Shinsuke HOMMA, Hiroshi KODAMA and Ryosuke MOCHIZUKI as inventors, the '330 application being based upon and claiming the benefit of priority from Japanese Patent Application No. 2009-264303, filed on Nov. 19, 2009 and Japanese Patent Application No. 2009-268087, filed on Nov. 25, 2009, the entire contents of which are incorporated herein by reference.

BACKGROUND OF THE INVENTION

1. Field of the Invention

The present invention relates to an imaging apparatus that captures an image of an object and thereby generates image data of the object.

2. Description of the Related Art

In recent years, for imaging apparatuses, such as digital cameras and video cameras, various technologies are disclosed that satisfy various demands of consumers by performing image processes on image data obtained by imaging an object. For example, a technology is well known in which, instead of using only image data of an image of a visual field containing an object in front of the imaging apparatus, image data of images of multiple visual fields around the imaging apparatus is combined, thereby allowing omnidirectional imaging (horizontal angle of 360 degrees) (see Japanese Laid-open Patent Publication No. 2006-180022).

SUMMARY OF THE INVENTION

An imaging apparatus according to an aspect of the present invention includes a first imaging unit that captures and generates an image of a visual field all around an axis as omnidirectional image data; an image converter that converts at least a part of the omnidirectional image data, which is generated by the first imaging unit, to image data having a rectangular display area and thereby generates conversion image data; and a display unit that displays an image corresponding to the conversion image data, which is generated by the image converter.

An imaging apparatus according to another aspect of the present invention includes a first imaging unit that captures and generates an image of a visual field all around an axis as omnidirectional image data; a slope detector that detects a slope of the axis with respect to the vertical direction; a correction amount calculator that calculates a correction amount necessary for setting a cut area to be cut from the omnidirectional image data, which is generated by the first imaging unit, according to a result of the detection by the slope detector; an area setting unit that sets the cut area according to the correction amount, which is calculated by the correction amount calculator; an image converter that converts at least a part of the cut area, which is set by the area setting unit, to image data having a rectangular display area and thereby generates conversion image data; and a display unit that displays an image corresponding to the conversion image data, which is generated by the image converter.

An imaging apparatus according to still another aspect of the present invention includes a first imaging unit that captures and generates an image of a visual field all around an axis as omnidirectional image data; a second imaging unit that has an optical axis orthogonal to the axis and captures and generates, as area image data, an image of a visual field with an angle of view of two directions that are orthogonal to each other on the optical axis, the angle of view being less than 180 degrees; an image converter that converts at least a part of the omnidirectional image data, which is generated by the first imaging unit, to image data having a rectangular display area and thereby generates conversion image data; an image synthesizer that synthesizes the conversion image data, which is generated by the image converter, and the area image data and thereby generates synthesis image data; and a display unit that displays an image corresponding to the synthesis image data that is generated by the image synthesizer.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 18 is a diagram illustrating an overview of an equidistant projection method;

DETAILED DESCRIPTION OF THE PREFERRED EMBODIMENTS

Preferred embodiments of an imaging apparatus according to the present invention will be described in detail below with reference to the drawings. Those embodiments do not limit the invention.

First Embodiment

Figure 1:
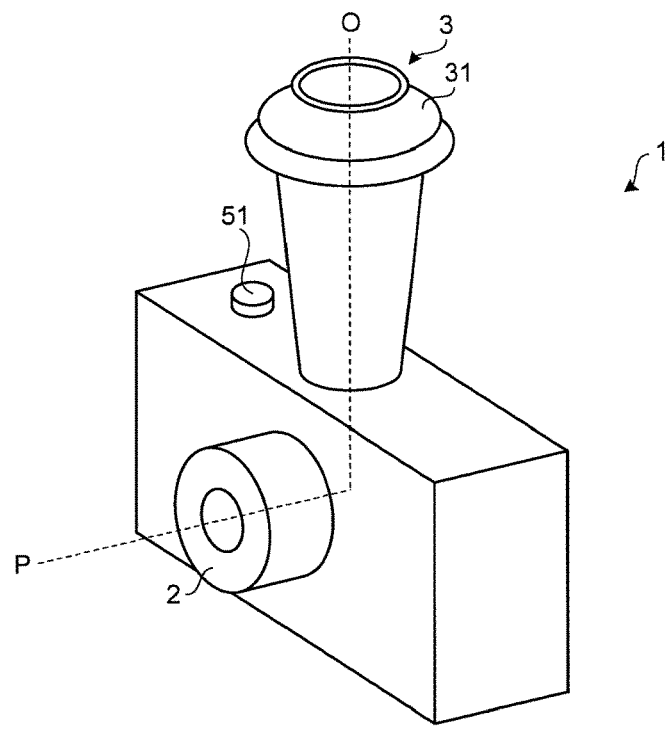
FIG. 1 is a perspective view of a front configuration of an imaging apparatus according to a first embodiment of the present invention.
Figure 2:
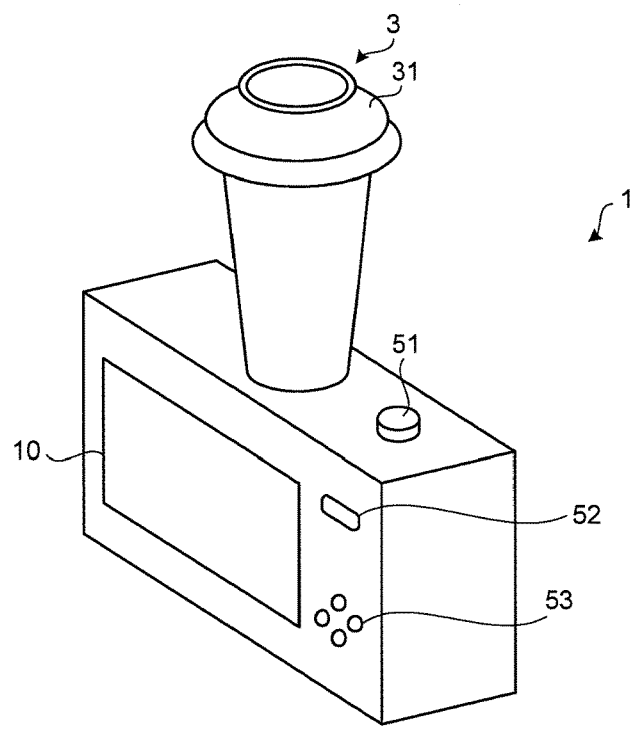
FIG. 2 is a perspective view of a back configuration of the imaging apparatus according to the first embodiment of the present invention.
Figure 3:
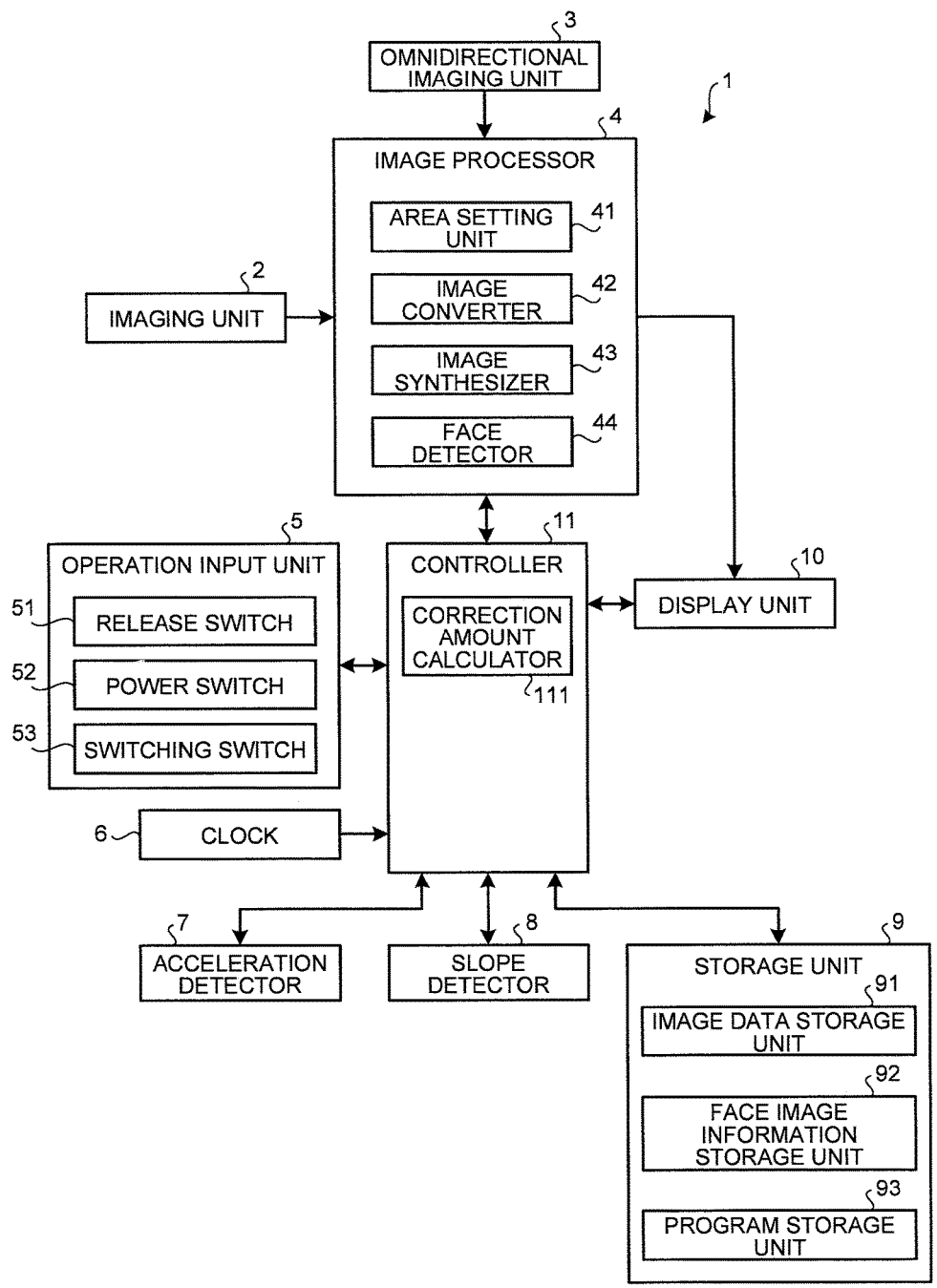
FIG. 3 is a block diagram of a functional configuration of the imaging apparatus according to the first embodiment of the present invention.

FIG. 1 is perspective view of a front configuration of an imaging apparatus according to a first embodiment of the present invention. FIG. 2 is a perspective view of a back configuration of the image processing apparatus according to the first embodiment of the present invention. FIG. 3 is a block diagram of a functional configuration of the imaging apparatus according to the first embodiment.

An imaging apparatus 1 illustrated in FIGS. 1 to 3 includes an imaging unit 2 that captures and generates, as area image data, an image of a visual field with an angle of view between two directions orthogonal to each other that is less than 180 degrees; an omnidirectional imaging unit 3 that captures and generates, as omnidirectional image data, an image of a visual field surrounding an axis (optical axis) O orthogonal to an optical axis P of the imaging unit 2; an image processor 4 that performs image processes, such as edge enhancement, color correction, and image compression, on the area image data generated by the imaging unit 2 and the omnidirectional image data generated by the omnidirectional imaging unit 3; an operation input unit 5 that receives inputs of various operation signals of the imaging apparatus 1; a clock 6 having a function of determining the imaging data and a timer function; an acceleration detector 7 that detects acceleration of the imaging apparatus 1; a slope detector 8 that detects a slope of the optical axis O of the omnidirectional imaging unit 3 with respect to the vertical direction according to the result of the detection of the acceleration detector 7; a storage unit 9 that stores various types of information containing the area image data and the omnidirectional image data on each of which the processes are performed by the image processor 4; a display unit 10 that displays information containing images corresponding to the image data processed by the image processor 4; and a controller 11 that controls operations of the imaging apparatus 1 according to operation signals that are input by the operation input unit 5.

The imaging unit 2 includes one or more lenses. The imaging unit 2 includes an optical system that focuses light from a predetermined visual field; an aperture that adjusts the amount of incident light that is focused by the optical system; a shutter that operates in response to an input of a release signal; an imaging device, such as a CCD (charge coupled device), that receives the light having transmitted the aperture and the shutter and converts the light into an electric signal; and a signal processing circuit that performs signal processes for, for example, amplification and white balance and then generates digital area image data by performing an A/D conversion.

Figure 4:
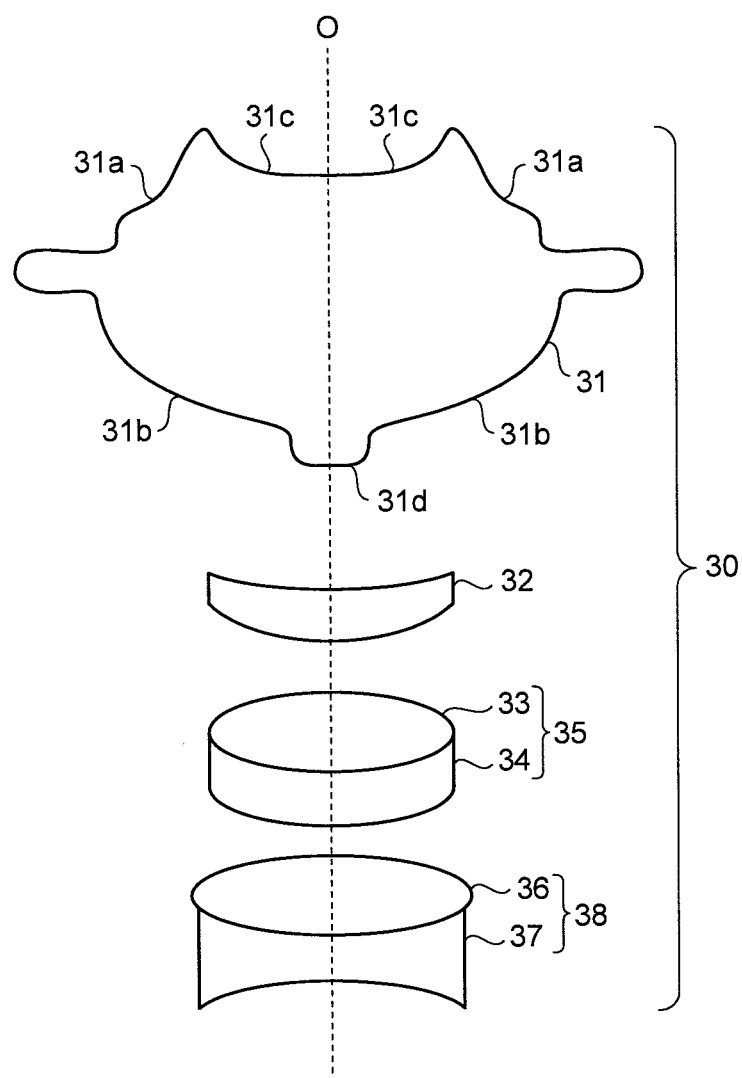
FIG. 4 is a schematic diagram of a configuration of an omnidirectional imaging unit of the imaging apparatus according to the first embodiment of the present invention.

Similar to the imaging unit 2, the omnidirectional imaging unit 3 includes an optical system, an aperture, a shutter, a CCD, and a signal processing circuit. FIG. 4 is a schematic diagram of a configuration of the optical system of the omnidirectional imaging unit 3. An optical system 30 shown in FIG. 4 is rotationally symmetric about the optical axis O. The optical system 30 includes an axial symmetrical free curved surface lens 31 that focuses light with an omnidirectional visual field (horizontal angle of view of 360 degrees) on the optical axis O; a positive meniscus lens 32 having a concave surface facing the axial symmetrical free curved surface lens 31; a cemented lens 35 including a double convex positive lens 33 and a negative meniscus lens 34 having a concave surface facing the axial symmetrical free curved surface lens 31; and a cemented lens 38 including a double convex positive lens 36 and a double concave negative lens 37. The axial symmetrical free curved surface lens 31 is formed of a transparent medium, such as resin, that has a refractive index larger than 1. The axial symmetrical free curved surface lens 31 includes a first transmission surface 31*a* on which a light flux from far is incident; a first reflection surface 31*b* on which the light flux from the first transmission surface 31*a* is incident and is reflected; a second reflection surface 31*c* on which the light flux reflected from the first reflection surface 31*b* is incident; and a second transmission surface 31*d* on which the optical flux reflected from the second reflection surface 31*c* is reflected.

The omnidirectional imaging unit 3 having the above-described configuration focuses light from the omnidirectional visual field around the optical axis O and converts the focused light into an electric signal. The omnidirectional imaging unit 3 then performs an A/D conversion by performing predetermined signal processes on the signal in order to generate an annulus image as omnidirectional image data. The configuration of the omnidirectional imaging unit 3 is disclosed in, for example, Japanese Laid-open Patent Publication No. 2006-243689, which is incorporated herein by reference.

The image processor 4 includes an area setting unit 41 that sets a cut area that is cut from the omnidirectional image data that is generated by the omnidirectional imaging unit 3 according to the result of the detection of the slope detector 8; an image converter 42 that converts at least a part of the cut area, which is set by the area setting unit 41, into image data having a rectangular display area and thereby generates conversion image data; an image synthesizer 43 that synthesizes the conversion image data generated by the image converter 42 and the area image data generated by the imaging unit 2 and thereby generates synthesis image data; and a face detector 44 that detects a face(s) of a person(s) contained in the omnidirectional image data, which is generated by the omnidirectional imaging unit 3, using a pattern matching method.

The operation input unit 5 includes a release switch 51 that inputs a release signal; a power switch 52 that inputs an instruction signal for turning on or turning off the power supply of the imaging apparatus 1; and a switching switch 53 that switches between various modes of display on the display unit 10 and between various operation modes. The display unit 10 may be provided with a touch panel as a part of the operation input unit 5 such that a photographer can input an operation signal via the screen of the display unit 10.

Figure 5:
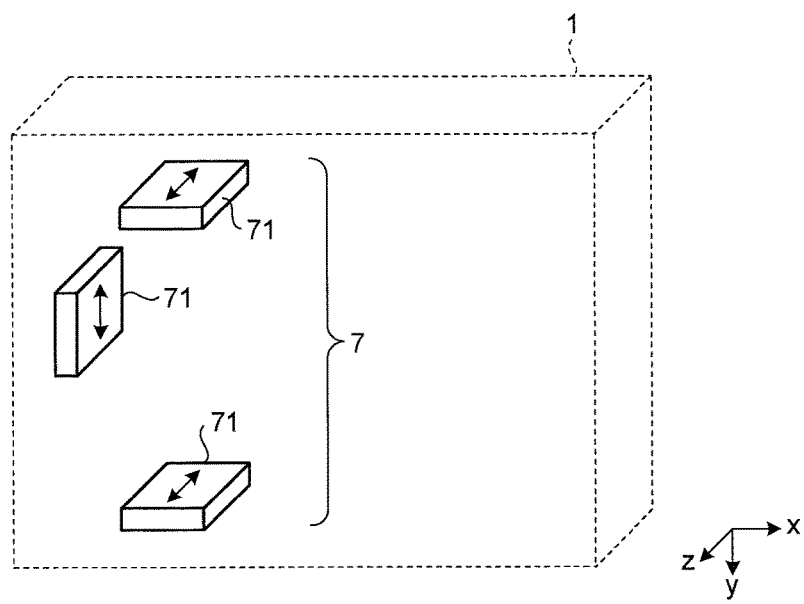
FIG. 5 is a diagram schematically showing a configuration of an acceleration detector of the imaging apparatus according to the first embodiment of the present invention.
Figure 6:
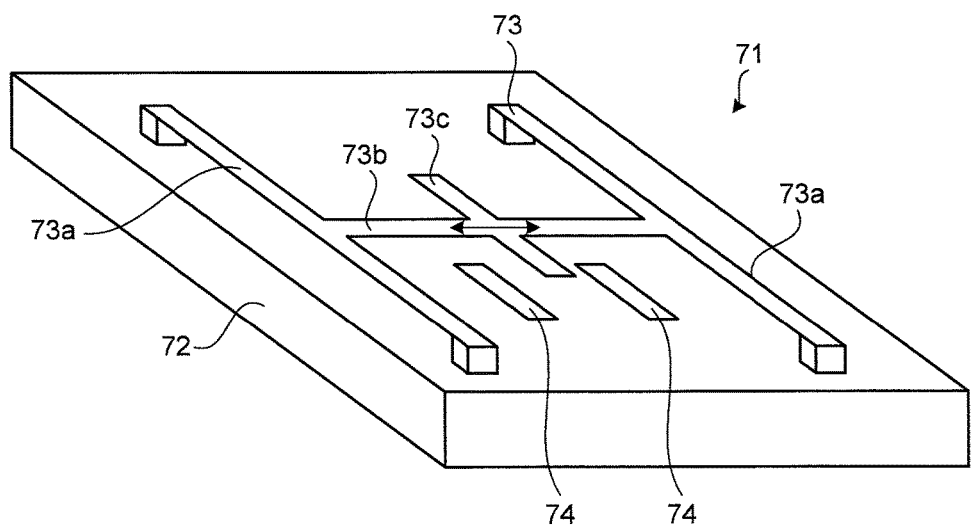
FIG. 6 is a diagram of a configuration of an acceleration sensor configuring a part of the acceleration detector of the imaging apparatus according to the first embodiment of the present invention.

FIG. 5 is a diagram schematically showing the configuration of the acceleration detector 7. As illustrated in FIG. 5, the acceleration detector 7 includes three acceleration sensors 71 orthogonal to each other. FIG. 6 is a diagram of a configuration of the acceleration sensor 71. The acceleration sensor 71 shown in FIG. 6 is a capacitance acceleration sensor that is formed by an MEMS (micro electro mechanical systems) process. The acceleration sensor 71 includes a metallic flexible portion 73 that has a bridge structure in which end portions of the metallic flexible portion 73 are fixed near the four corners on the main surface of a chip 72; and two metallic platy portions 74 that are provided on the main surface of the chip 72 on which the end portions of the flexible portion 73 are fixed. The flexible portion 73 includes two belt-shaped extension portions 73*a* extending in the same direction along the main surface of the chip 72; a belt-shaped connecting portion 73*b* that connects middle portions of the extension portions 73*a* along the direction orthogonal to the direction in which the extension portions 73*a* extends; and a protrusion portion 73*c* that is belt-shaped and protrudes from the middle portion of the connecting portion 73*b* to be parallel to the direction in which the extension portions 73*a* extends.

In the acceleration sensor 71 having the above-described configuration, when an acceleration is applied in the right-left direction (direction represented by the arrow) in FIG. 6, the flexible portion 73, excluding the end portions of the extension portions 73*a*, warps in the right-left direction and accordingly deforms. Accordingly, the positional relationship between the protrusion portion 73*c* and the platy portions 74 varies and the capacitance varies accordingly. The acceleration sensor 71 outputs a variation of a signal according to the variation of the capacitance. The acceleration detector 7 can be also used when making a judgment on camera shake and when making a correction according to the judgment.

The storage unit 9 includes an image data storage unit 91 that stores the area image data and the omnidirectional image data each of which is processed by the image processor 4; a face image information storage unit 92 that stores face image information that is referred to when detecting a face image by the face detector 44; and a program storage unit 93 that stores various programs that are executed by the imaging apparatus 1. The storage unit 9 is realized using a semiconductor memory, such as a flash memory or a RAM (random access memory), that is incorporated in the imaging apparatus 1. While information is stored in a storage medium, such as a memory card, that is externally attached, the storage unit 9 may have a function as a recording medium interface that reads information that is stored in the storage medium.

The display unit 10 is provided on the back surface of the imaging apparatus 1. The back surface is on the back of the front surface from which the optical system of the imaging unit 2 protrudes. The display unit 10 is realized using a display panel including, for example, crystal liquids, plasma, or organic EL (electro luminescence). The display unit 10 can display information on operation information and operations of the imaging apparatus 1 in addition to the area image data, the omnidirectional image data, and the synthesis image data.

The controller 11 includes a correction amount calculator 111 that calculates an amount of correction necessary for setting a cut area to be cut from the omnidirectional image data that is generated by the omnidirectional imaging unit 3 according to the result of the detection by the slope detector 8. The controller 11 is realized using a CPU (central processing unit) and is connected to each component of the imaging apparatus 1 via a bus line.

Figure 7:
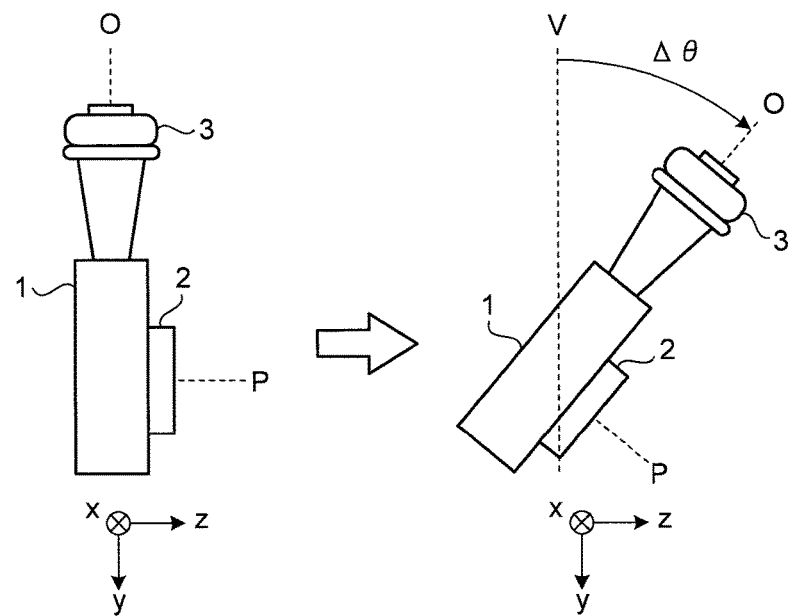
FIG. 7 is a diagram illustrating that the posture of the imaging apparatus according to the first embodiment of the present invention changes.

Detection of a slope of the imaging apparatus 1 by the acceleration detector 7 will be described below. FIG. 7 is a diagram illustrating that the posture of the imaging apparatus 1 changes. Specifically, a photographer slopes down the optical axis P of the imaging unit 2 with respect to the horizontal direction (the z-axis direction).

Figure 8:
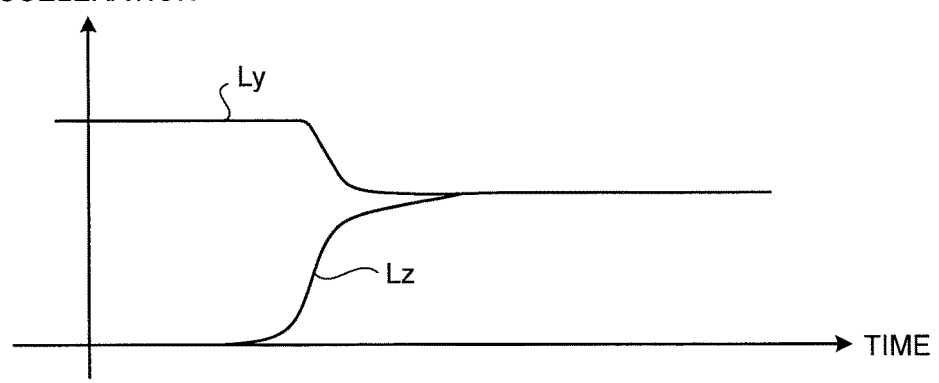
FIG. 8 is a diagram schematically showing acceleration that is detected by the acceleration detector.

FIG. 8 is a diagram of time variations of the magnitude of the gravitational acceleration that are detected by the acceleration detector 7 when the posture of the imaging apparatus 1 changes as illustrated in FIG. 7. As shown in FIG. 8, the curve line Ly represents time variations of the magnitude of the gravitational acceleration of the imaging apparatus 1 in the y axis (vertical direction). The curve line Lz represents time variations of the magnitude of the gravitational acceleration in the z-axis (horizontal direction). In FIG. 8, the horizontal axis represents the time and the vertical axis represents the magnitude of the gravitational acceleration. In accordance with the posture of the imaging apparatus 1 illustrated in FIG. 7, as the components of the x-axis direction of the gravitational acceleration applied to the imaging apparatus 1 increase, the components of the y-axis direction decrease. In this case, the components of the gravitational acceleration in the x-axis direction almost do not vary, keeps at about 0. When the acceleration detector 7 detects time variations of the gravitational acceleration illustrated in FIG. 8, the slope detector 8 detects a slope Δθ of the optical axis O of the imaging apparatus 1 with respect to the vertical plane V according to the component ratio of the gravitational acceleration. Hereinafter, the slope of the optical axis O of the imaging apparatus 1 to the vertical plane V is simply referred to as "the slope of the imaging apparatus 1". In the case illustrated in FIG. 8, because the he y-axis components and the x-components of the gravitational acceleration are equal and thus the slope Δθ of 45 degrees is detected.

Figure 9:
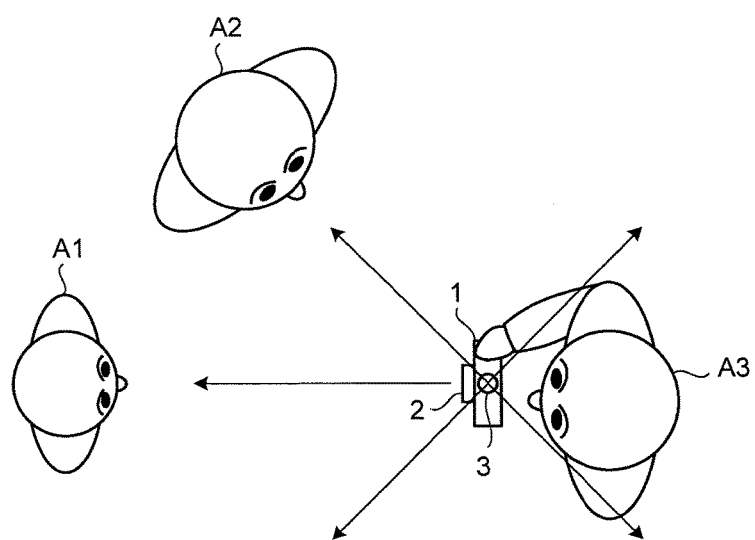
FIG. 9 is a diagram illustrating an environment in which an image is captured using the imaging apparatus according to the first embodiment of the present invention.
Figure 10:
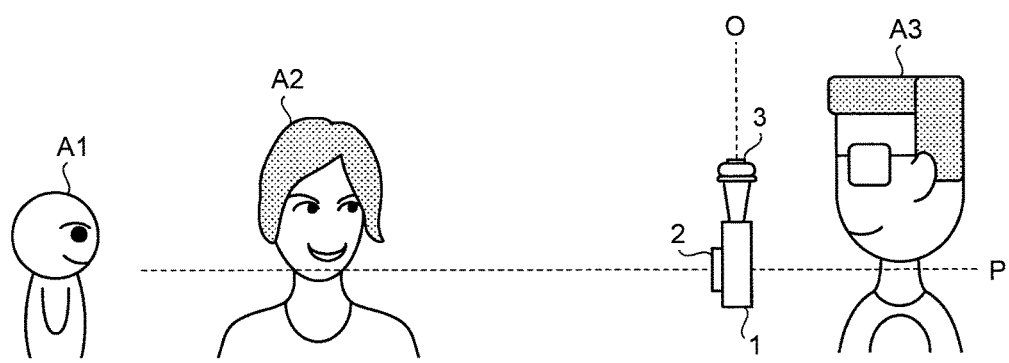
FIG. 10 is a horizontal view of the environment illustrated in FIG. 9.

An imaging process that is performed by the imaging apparatus 1 will be described below. FIG. 9 is a diagram illustrating an environment in which the imaging process is performed using the imaging apparatus 1. FIG. 10 is a horizontal view of the environment illustrated in FIG. 9. In the case illustrated in FIGS. 9 and 10, the optical axis O of the omnidirectional imaging unit 3 is parallel to the vertical direction.

In the case illustrated in FIGS. 9 and 10, there are three objects A1 (baby), A2 (mother), and A3 (father) around the imaging apparatus 1. The faces of the three objects A1 to A3 are at an approximately equal level. A photographer is the object A3. The object of the imaging unit 2 is the object A1. Under this environment, when the object A3 captures images using simultaneously the imaging unit 2 and the omnidirectional imaging unit 3, the imaging unit 2 captures an image of the object A1 and the omnidirectional imaging unit 3 captures an image of the surroundings of the imaging apparatus 1 including the objects A1 to A3.

Figure 11:
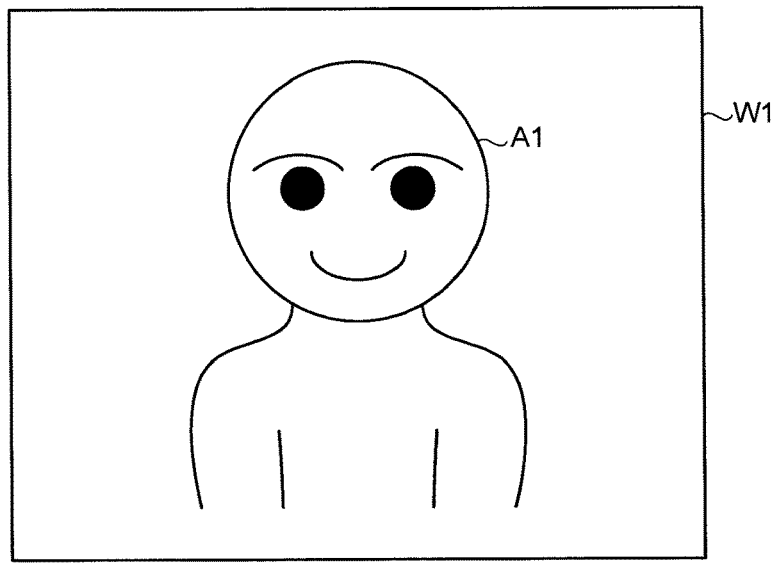
FIG. 11 is a view of area image data that is generated by an imaging unit under the environment illustrated in FIG. 9.

FIG. 11 is a view of the area image data that is generated by the imaging unit 2. Area image data W1 shown in FIG. 11 is an image captured with a visual field of the object A1 and areas around the object A1.

Figure 12:
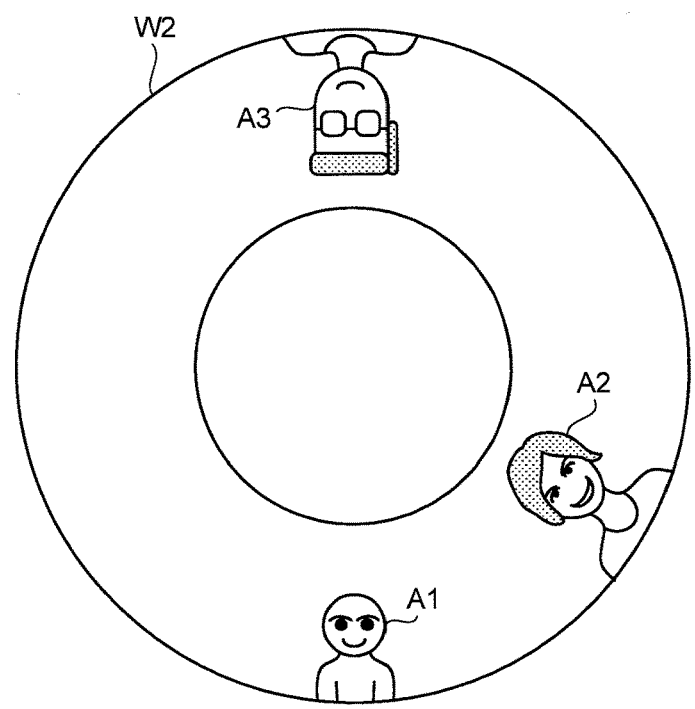
FIG. 12 is a view of omnidirectional image data that is generated by an omnidirectional imaging unit under the environment illustrated in FIG. 9.

FIG. 12 is a view of the omnidirectional image data that is generated by the omnidirectional imaging unit 3. FIG. 12 is a view on the imaging plane viewed from the back of the imaging device. In omnidirectional image data W2 shown in FIG. 12, images of the objects A1 to A3 are in the annular display area. The center axes of the faces of the three objects A1 to A3 pass through the center of the annulus. The object close to the center of the annulus corresponds to the vertically upper side. The object A1 positioned in front of the imaging apparatus 1 is in a lower position with respect to the center of the annulus. The object A3 positioned on the back of the imaging apparatus 1 is in an upper position with respect to the center of the annulus. The object A2 is in an obliquely right upper position with respect to the object A1.

An overview of a process that is performed by the imaging apparatus 1 using the area image data W1 and the omnidirectional image data W2 will be given below. The correction amount calculator 111 calculates an amount of correction necessary for setting a cut area to be cut from the omnidirectional image data W2. Under the environment illustrated in FIG. 9, the optical axis O of the omnidirectional imaging unit 3 is parallel to the vertical direction and the imaging apparatus 1 does not slope. In such a case, the correction amount calculated by the correction amount calculator 111 is zero.

Figure 13:
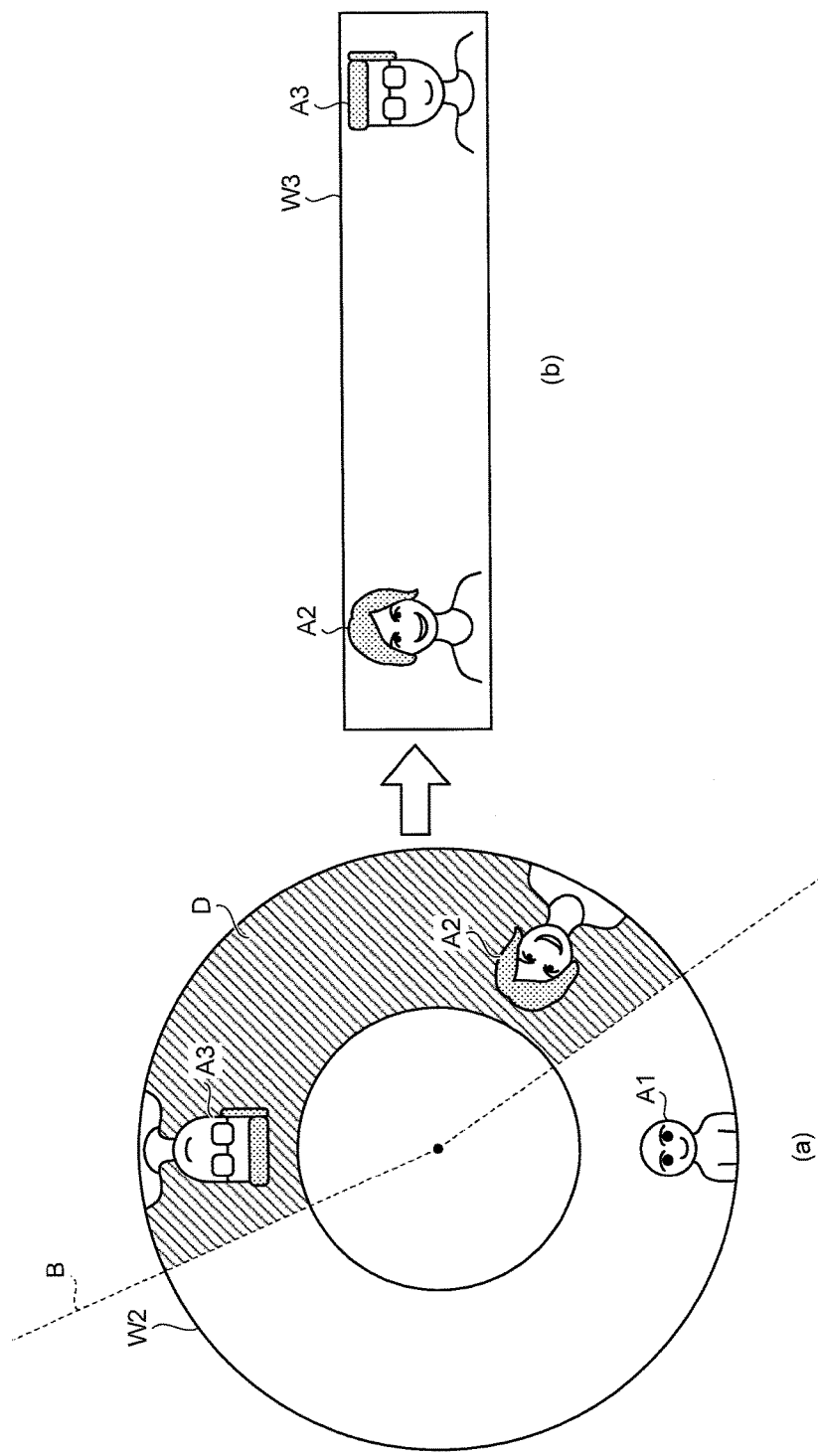
FIG. 13 is a diagram illustrating an overview of a process that is performed by an image converter under the environment illustrated in FIG. 9.

The area setting unit 41 then sets a cut area to be cut as an area to be converted. FIG. 13 is a diagram representing an overview of the process that is performed by the area setting unit 41 and the image converter 42 under the environment illustrated in FIG. 9. As illustrated in FIG. 13, the area setting unit 41 excludes an area overlapping the visual field of the area image data W1 from the area to be converted in the omnidirectional image data W2, extracts the maximum area containing all the faces of the persons detected by the face detector 44 from the remaining area, and sets a cut area D by providing a border B corresponding to the extracted maximum area (FIG. 13(a)).

Thereafter, the image converter 42 converts the cut area D into a rectangular area and thereby generates rectangular conversion data W3 (FIG. 13(b)). The method of setting a cut area by the area setting unit 41 can be appropriately changed.

Figure 14:
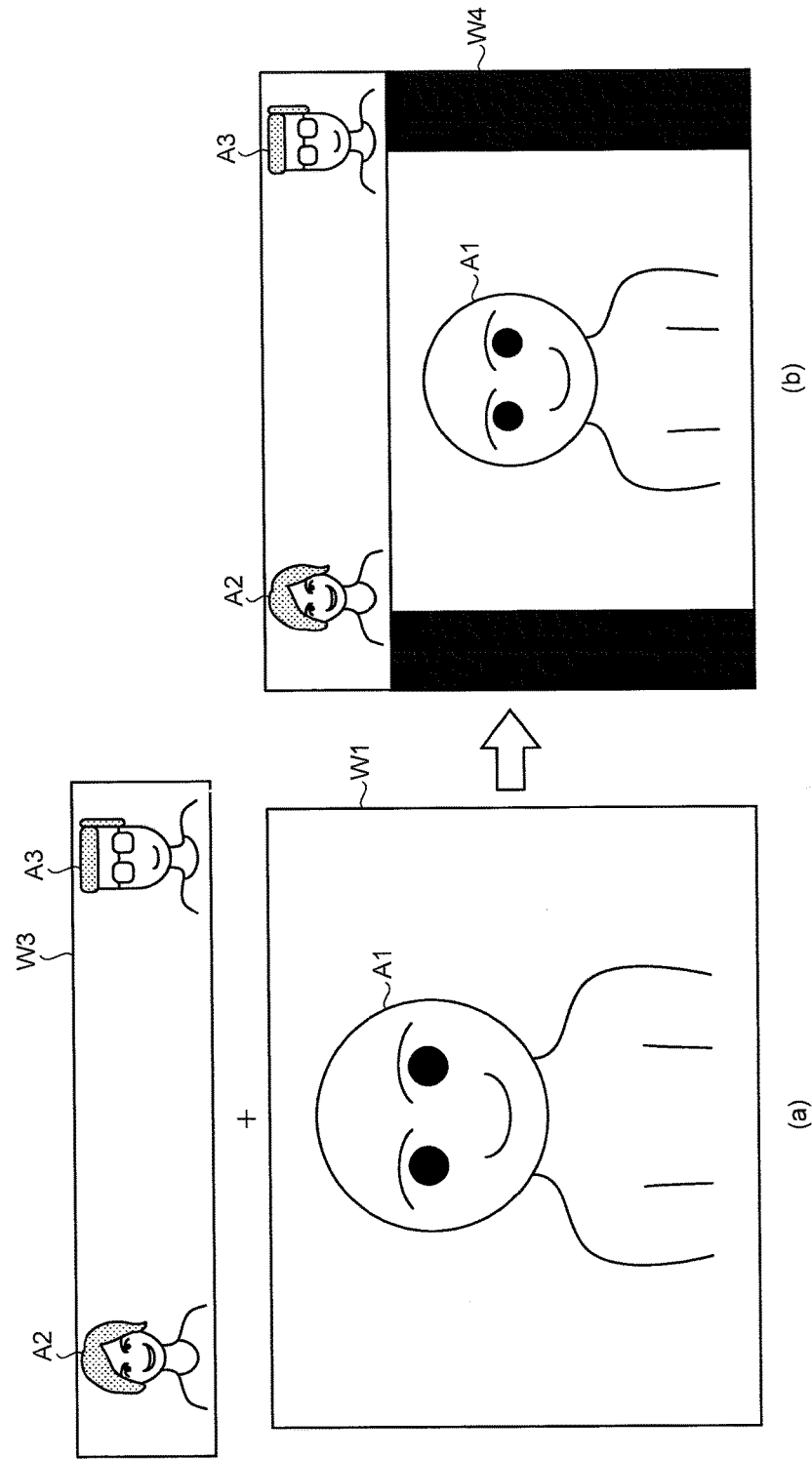
FIG. 14 is a diagram illustrating an overview of a process that is performed by an image synthesizer under the environment illustrated in FIG. 9.

FIG. 14 is a diagram representing an overview of a process performed by the image synthesizer 43 according to the image data of an image captured in the situation illustrated in FIG. 9. More specifically, FIG. 14 is a diagram representing an overview of a process for synthesizing the area image data W1 generated by the imaging unit and the conversion image data W3 generated by the image converter 42 and thereby generating synthesis image data. The image synthesizer 43 reduces the sizes of the area image data W1 and the conversion image data W3 shown in FIG. 14(a) while keeping the aspect ratio and arranges the size-reduced conversion image data W3 above the size-reduced area image data W1, thereby generating synthesis data W4 (FIG. 14(b)). The ratio of the vertical length of the display area of the area image data W1 to the vertical length of the display area of the conversion image data W3 may be appropriately set by an input from the switching switch 53. The conversion image data W3 may run off the screen horizontally; therefore, for example, it is more preferable that the display area of the conversion image data W3 be selected via the operation input unit 5. The image synthesizer 43 may arrange the conversion image data W3 below the area image data W1.

Figure 15:
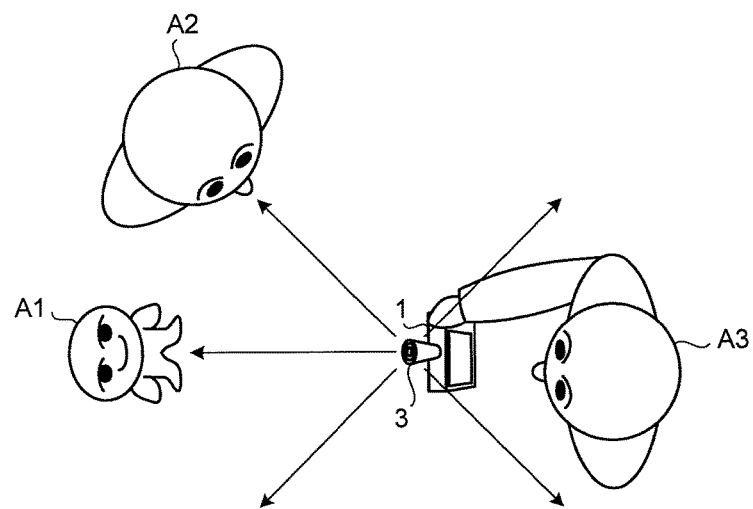
FIG. 15 is a diagram illustrating an environment (second example) in which an image is captured using the imaging apparatus according to the first embodiment of the present invention.
Figure 16:
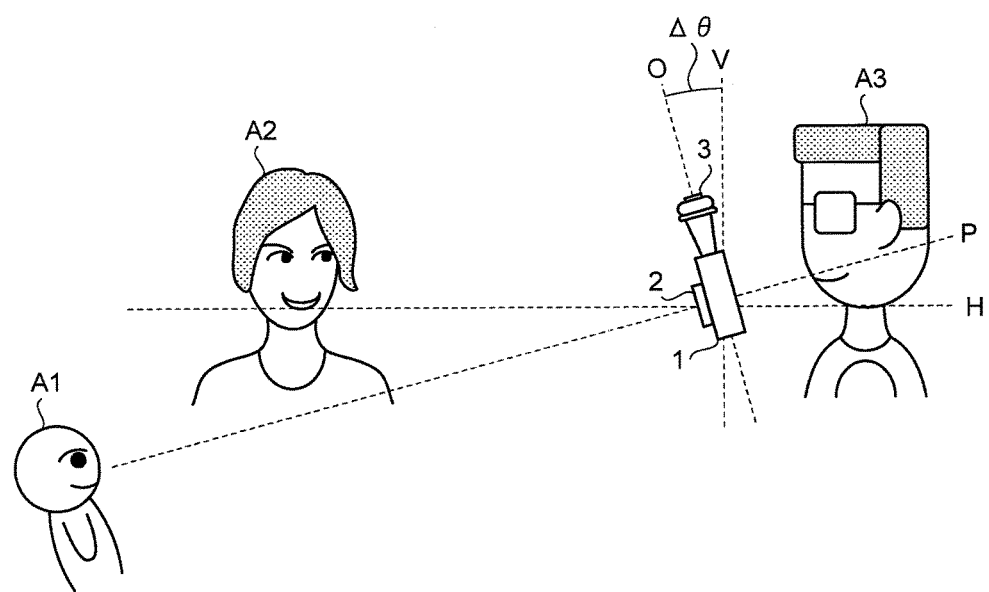
FIG. 16 is a horizontal view of the environment illustrated in FIG. 15.

FIG. 15 is a diagram illustrating an environment (second example) in which an image is captured using the imaging apparatus 1. FIG. 16 is a horizontal view of the environment illustrated in FIG. 15. In the case illustrated in FIGS. 15 and 16, only the vertical position of the face of the object A1 is different among those of the three objects A1 to A3 and, furthermore, only the line of sight of the object A1 extends obliquely upward; therefore, the object A3 slopes down the imaging apparatus 1 according to the posture of the object A1. In this case, the optical axis O of the omnidirectional imaging unit 3 intersects with the vertical plane V at a slope of Δθ. It is assumed that the area image data generated by the imaging unit 2 is the same as the area image data W1 shown in FIG. 11.

Figure 17:
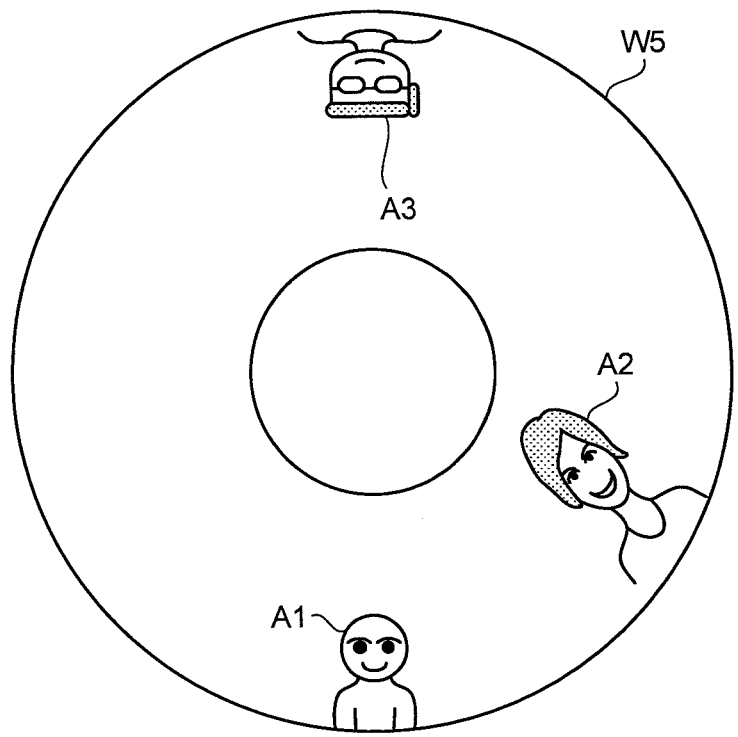
FIG. 17 is a view of omnidirectional image data that is generated by the omnidirectional imaging unit under the environment illustrated in FIG. 15.

FIG. 17 is a view of omnidirectional image data that is generated by the omnidirectional imaging unit 3 when the object A3 captures images simultaneously using the imaging unit 2 and the omnidirectional imaging unit 3 under the environment illustrated in FIG. 15. Similar to the omnidirectional image data W2 shown in FIG. 12, in omnidirectional image data W5 shown in FIG. 17, images of the objects A1 to A3 are in an annular display area. Under the environment illustrated in FIG. 15, the optical axis O of the omnidirectional imaging unit 3 is skew with respect to the vertical center axis of the face of the object A2; therefore, in the omnidirectional image data W5, the center axis of the face of the object A2 slopes with respect to the radial direction of the annulus. Furthermore, under the environment illustrated in FIG. 15, the center axis of the face of the object A3 intersects with the optical axis O of the omnidirectional imaging unit 3 and the position of the face of the object A3 becomes away from the omnidirectional imaging unit 3; therefore the face of the object A3 becomes away from the center and thus a horizontally extended image of the object A3 is formed.

An overview of a process that is performed by the imaging apparatus 1 using the area image data W1 and the omnidirectional image data W5 will be given below. The correction amount calculator 111 calculates a correction amount necessary for setting a cut area to be cut from the omnidirectional image data W5. Under the environment illustrated in FIG. 15, the slope of the imaging apparatus 1 is Δθ. A method of obtaining a correction amount Δr in the case when the omnidirectional imaging unit is an optical system of an equidistant projection method will be described. FIG. 18 is a diagram illustrating an overview of the equidistant projection method. FIG. 18(a) assumes a type in which an image is formed on a side the same as that of an incident light that is incident on the center of the eye with respect to a perpendicular extending from the center of the imaging plane. FIG. 18(b) assumes a type of optical system in which an image is formed on a side opposite to that of an incident light that is incident on the center of the eye with respect to the perpendicular extending from the center of the imaging plane. In the optical systems of the equidistant projection methods illustrated in FIGS. 18(a) and 18(b), the angle at which light is incident and the image height, that is a distance from the center of the screen are proportional to each other. Thus, for example, regarding the projection positions of lights (passing through the points $P_1$ and $P_2$) whose angles of incidence are θ and 2θ, respectively, when assuming that the zenith is zero, the image heights $r_1$ and $r_2$ at the projection positions $Q_1$ and $Q_2$ shown in FIG. 18(a) satisfy the relation of $r_2 = 2r_1$ and the image heights $r'_1$ and $r'_2$ at the projection positions $Q'_1$ and $Q'_2$ shown in FIG. 18(b) satisfies the relation of $r'_1 = 2r'_2$. Thus, for example, when an area of an angle of incidence of ±90 degrees is projected to a circle of which diameter is 2R, the correction amount calculator 111 calculates a variation amount Δr obtained when the optical axis O of the imaging apparatus 1 slopes from the vertical state by Δθ according to the following Equation (1).

$$\Delta r = \Delta\theta \times R/90 \qquad (1)$$

Figure 19:
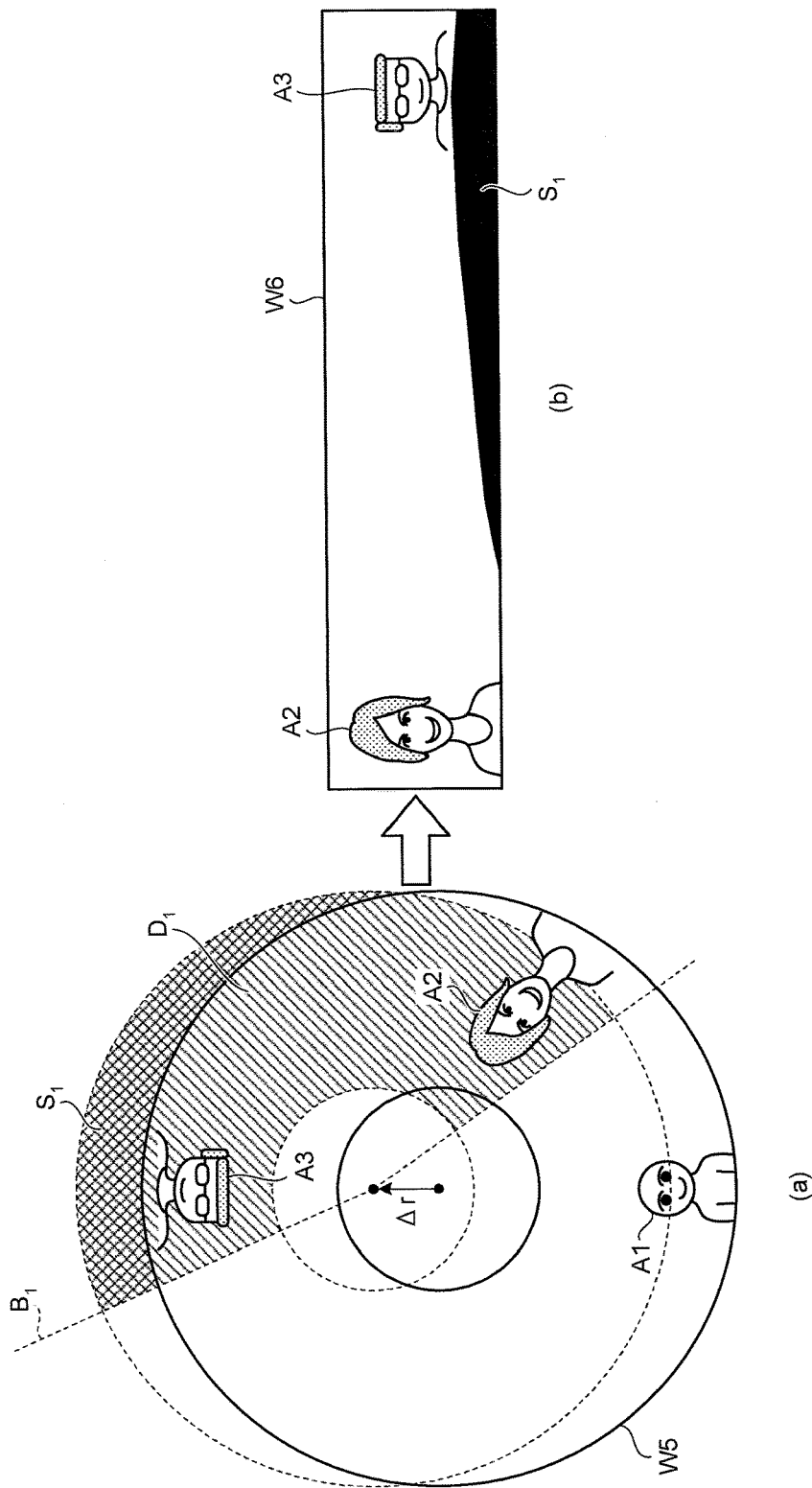
FIG. 19 is a diagram illustrating an overview of a process that is performed by the image converter under the environment illustrated in FIG. 15.

FIG. 19 is a diagram illustrating an overview of a process performed on the omnidirectional image data W5 of an image captured under the environment illustrated in FIG. 15. The area setting unit 41 sets a virtual annulus that is shifted in the direction opposite to the slope direction by the correction amount Δr that is set by the correction amount calculator 111 (represented by the dotted line shown in FIG. 19(a). The direction in which the annulus is shifted is different between the optical system of the type illustrated in FIG. 18(a) and the optical system of the type illustrated in FIG. 18(b). In the case of the optical system of the type illustrated in FIG. 18(b), the annulus is shifted in the same direction as that of the slope direction). Subsequently, an area overlapping the visual field of the area image data W1 is excluded from the area to be converted in the virtual annulus, which is set by the area setting unit 41. Thereafter, the maximum area containing all the faces of the persons that are detected by the face detector 44 is extracted from the remaining area and a cut area $D_1$ is set by arranging a border $B_1$ corresponding to the extracted area (see FIG. 19(a)).

Thereafter, the image converter 42 converts the cut area $D_1$ into a rectangular area and thereby generates conversion image data W6 (FIG. 19(b)). In this case, the image converter 42 does not display any image on a non-imaged area $S_1$ that is not imaged yet by the omnidirectional imaging unit 3 out of the cut area $D_1$ by displaying the non-imaged area $S_1$ in black. In the conversion image data W6 generated as described above, the slope of the faces of the objects A2 and S3 is canceled. The area to be converted by the image converter 42 may be set by an operation of the operation input unit 5.

Figure 20:
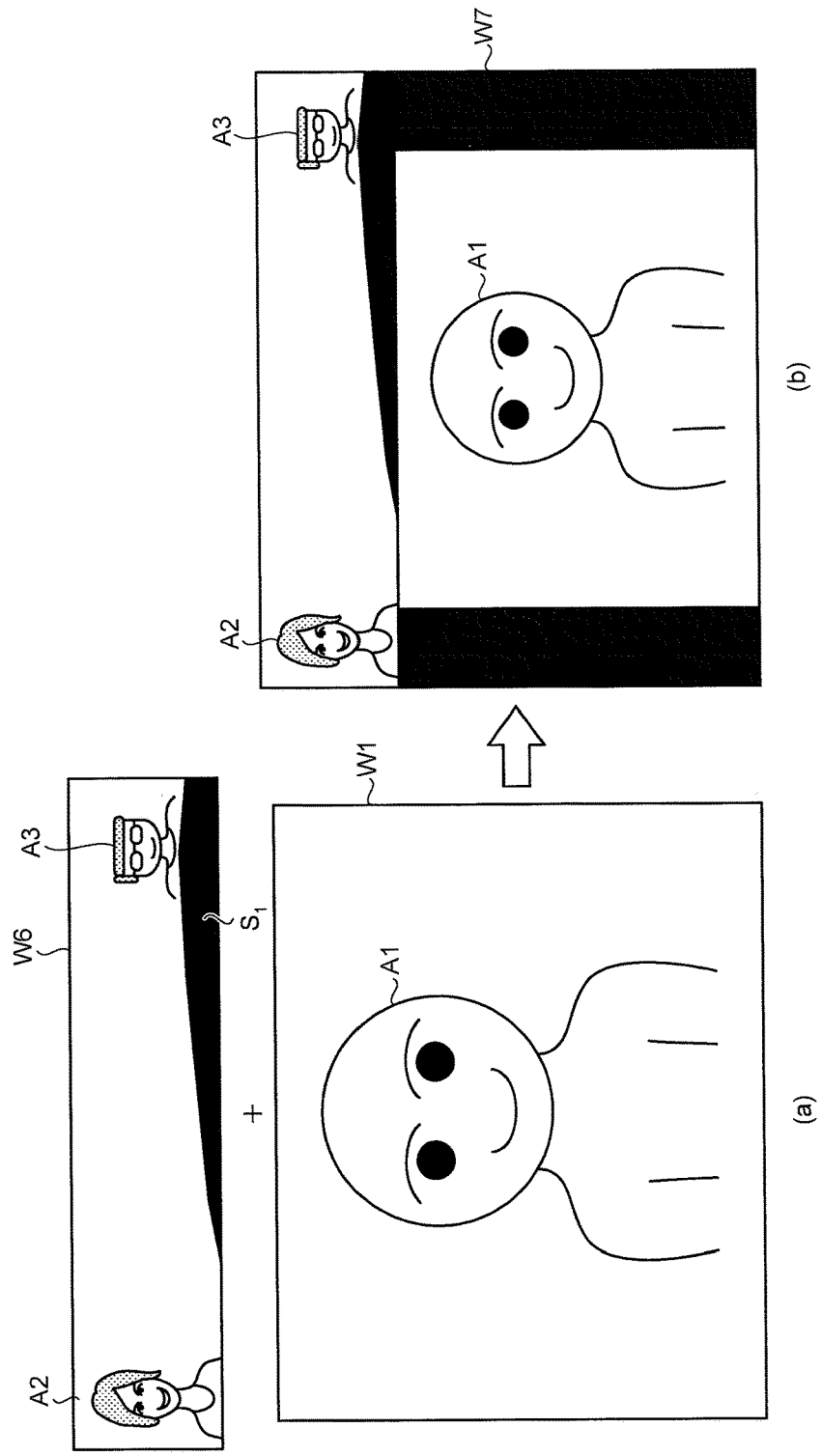
FIG. 20 is a diagram illustrating an overview of a process that is performed by an image synthesizer under the environment illustrated in FIG. 15.

FIG. 20 is a diagram illustrating an overview of a process that is performed by the image synthesizer 43 under the environment illustrated in FIG. 15. More specifically, FIG. 20 is a diagram illustrating an overview of a process synthesizing the area image data W1 generated by the imaging unit 2 and the conversion image data W6 generated by the image converter 42 and thereby generating synthesis image data. The image synthesizer 43 reduces the size of the area image data W1 and the conversion image data W6 shown in FIG. 20(a) while keeping the aspect ratio and arranges the size-reduced conversion image data W6 above the size-reduced area image data W1, thereby generating synthesis image data W7 (FIG. 20(b)).

By performing such an image synthesis, even if an image of an object, which is captured by the omnidirectional imaging unit 3, deforms due to a change of the posture of the imaging apparatus 1, the slope of the object in the right-left direction can be converted into a normal state and the normal image can be displayed accordingly.

Figure 21:
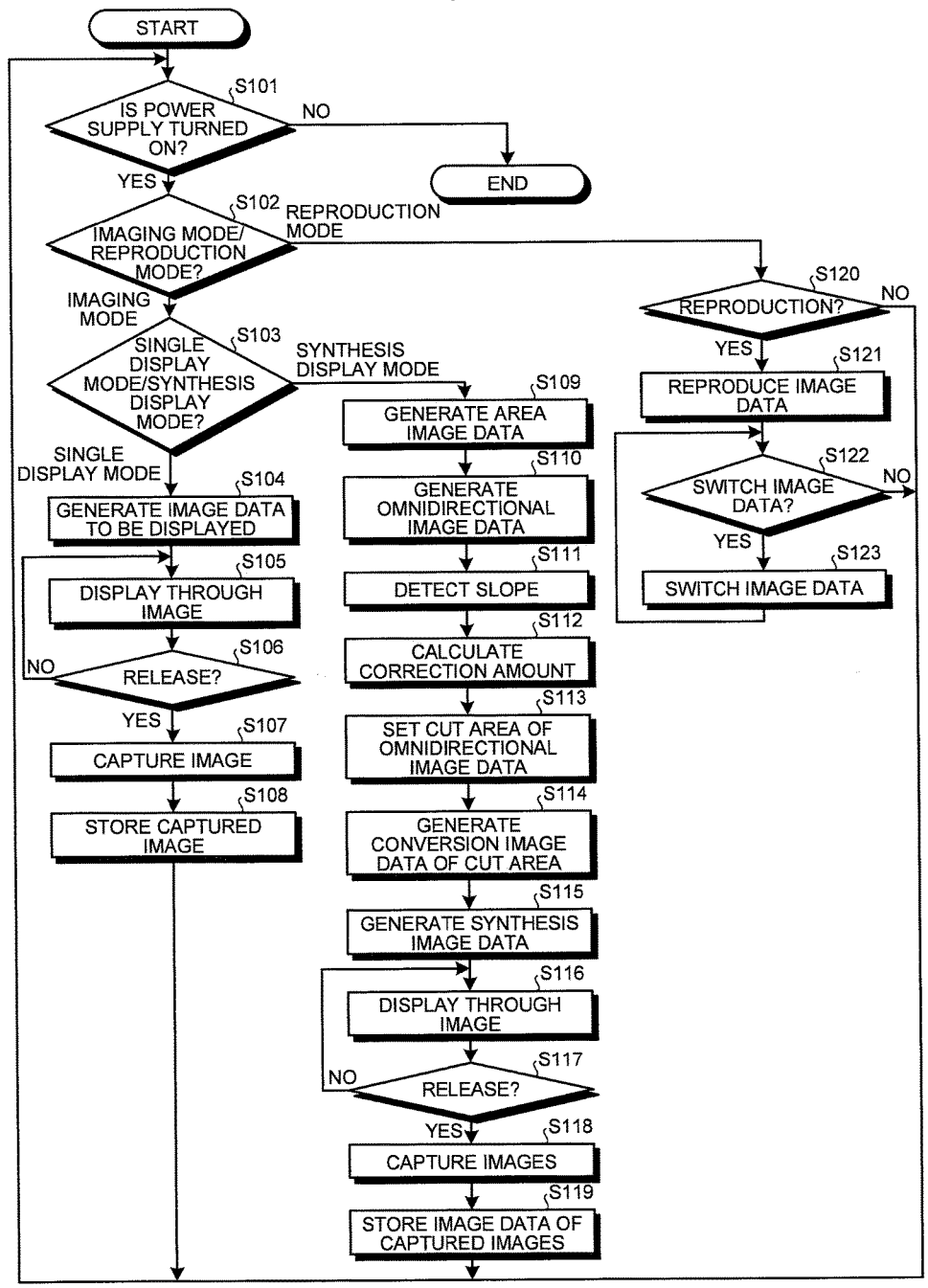
FIG. 21 is a flowchart of an overview of processes that are performed by the imaging apparatus according to the first embodiment of the present invention.

FIG. 21 is a flowchart of an overview of the processes performed by the imaging apparatus 1. As illustrated in FIG. 21, the controller 11 determines whether the power switch 52 is operated and the power supply of the imaging apparatus 1 is turned on (step S101). When the power supply of the imaging apparatus 1 is not turned on (NO at step S101), the imaging apparatus 1 ends the process. In contrast, when the power supply of the imaging apparatus 1 is turned on (YES at step S101), the imaging apparatus 1 goes to step S102.

The controller 11 then determines whether an imaging mode or a reproduction mode is set (step S102). When the imaging mode is set (imaging mode at step S102), the imaging apparatus 1 goes to step S103. In contrast, when the reproduction mode is set (reproduction mode at step S102), the imaging apparatus 1 goes to step S120.

At step S103, the controller 11 determines whether a single display mode or a synthesis display mode is set in the imaging mode. When the single display mode is set (single display mode at step S103), the imaging apparatus 1 goes to step S104. In contrast, when the synthesis display mode is set (synthesis display mode at step S103), the imaging apparatus 1 goes to step S109.

The case in which the single display mode is set (single display mode at step S103) in the imaging apparatus 1 will be described first. In this case, only the imaging unit that generates image data of which displaying is selected starts and generates image data (step S104). In other words, when displaying area image data of an image captured by the imaging unit 2 is selected, the imaging unit 2 generates area image data. On the other hand, when displaying omnidirectional image data of an image captured by the omnidirectional imaging unit 3 is selected, the omnidirectional imaging unit 3 generates omnidirectional image data.

Thereafter, the display unit 10 displays a live view image of the image data generated at step S104 (step S105). When displaying image data generated by the imaging unit 2 is selected, for example, the live view image to be displayed here is the area image data W1 shown in FIG. 11. When displaying image data generated by the omnidirectional imaging unit 3 is selected, for example, the live view image to be displayed here is the rectangular display of the omnidirectional image data W2, shown in FIG. 12, on the display unit 10.

The controller 11 then determines whether a release signal is input by an operation of the release switch 51 (step S106). When no release signal is input (NO at step S106), the process goes to step S105. In contrast, when a release signal is input (YES at step S106), the imaging apparatus 1 captures an image displayed as the live view image (step S107).

The imaging apparatus 1 then stores, in the image data storage unit 91, the image data of an image that is captured by the imaging unit 2 or the omnidirectional imaging unit 3 and processed by the image processor 4 (step S108) and goes to step S101.

The case in which the synthesis display mode is set at step S103 (synthesis display mode at step S103) will be described. In this case, the imaging unit 2 generates area image data (step S109) and the omnidirectional imaging unit 3 generates omnidirectional image data (step S110).

The slope detector 8 then detects the slope $\Delta\theta$ of the imaging apparatus 1 according to time variations of the magnitude of the gravitational acceleration of the imaging apparatus 1, which is detected by the acceleration detector 7 periodically (Step S111).

The correction amount calculator 111 calculates a correction amount $\Delta r$ corresponding to the slope $\Delta\theta$ detected by the slope detector 8 (step S112).

The area setting unit 41 then sets a cut area according to the correction amount $\Delta r$ calculated by the correction amount calculator 111 (step S113). The image converter 42 then generates conversion image data by converting the cut area set by the area setting unit 41 to a rectangular area (step S114). The processes at steps S113 and S114 correspond to, for example, the processes described with reference to FIGS. 13 and 19.

The image synthesizer 43 generates synthesis image data by synthesizing the conversion image data generated by the image converter 42 and the area image data generated by the imaging unit 2 (step S115). The process at step S115 corresponds to, for example, the process described with reference to FIG. 14 and FIG. 20.

The display unit 10 then displays a live view image of the synthesis image data generated by the image synthesizer 43 (step S116).

The controller 11 determines whether a release signal is input by an operation of the release switch 51 (step S117). When no release signal is input (NO at step S117), the imaging apparatus 1 returns to step S116. In contrast, when a release signal is input (YES at step S117), the imaging apparatus 1 captures images by the imaging unit 2 and the omnidirectional imaging unit 3 (step S118).

Thereafter, the imaging apparatus 1 stores the area image data generated by the imaging unit 2 and the omnidirectional image data generated by the omnidirectional imaging unit 3 in the image data storage unit 91 (step S119) and then goes to step S101.

The case in which the imaging apparatus 1 is set to the reproduction mode at step S102 (reproduction mode at step S102) will be described. In this case, the controller 11 determines whether a reproduction instruction signal is input from the operation input unit 5 (step S120). When no reproduction instruction signal is input (NO at step S120), the imaging apparatus 1 goes to step S101. In contrast, when a reproduction instruction signal is input (YES at step S120), the display unit 10 reproduces and displays image data specified among the image data stored in the image data storage unit 91 (step S121).

The controller 11 then determines whether a switching signal for switching the image data displayed on the display unit 10 is input by an operation of the switching switch 53 (step S122). When no switching signal is input (NO at step S122), the imaging apparatus 1 goes to step S101. In contrast, when a switching signal is input (YES at step S122), the display unit 10 switches the displayed image data (step S123) and goes back to step S122.

According to the above-described first embodiment of the present invention, a slope of the optical axis of the omnidirectional imaging unit with respect to the vertical direction is detected, a correction amount for setting a cut area to be cut from omnidirectional image data is calculated according to the result of the detection of the slope, a cut area that is set according to the correction amount is converted to image data having a rectangular display area, and then the image data is displayed. Thus, the image data can be corrected according to the slope. Accordingly, even when the imaging apparatus 1 that slopes captures an omnidirectional image, an easy-to-see display can be realized.

In the first embodiment, even when the single display mode is set, the image converter 42 may generate conversion image data and the display unit 10 may display the generated conversion data.

Second Embodiment

Figure 22:
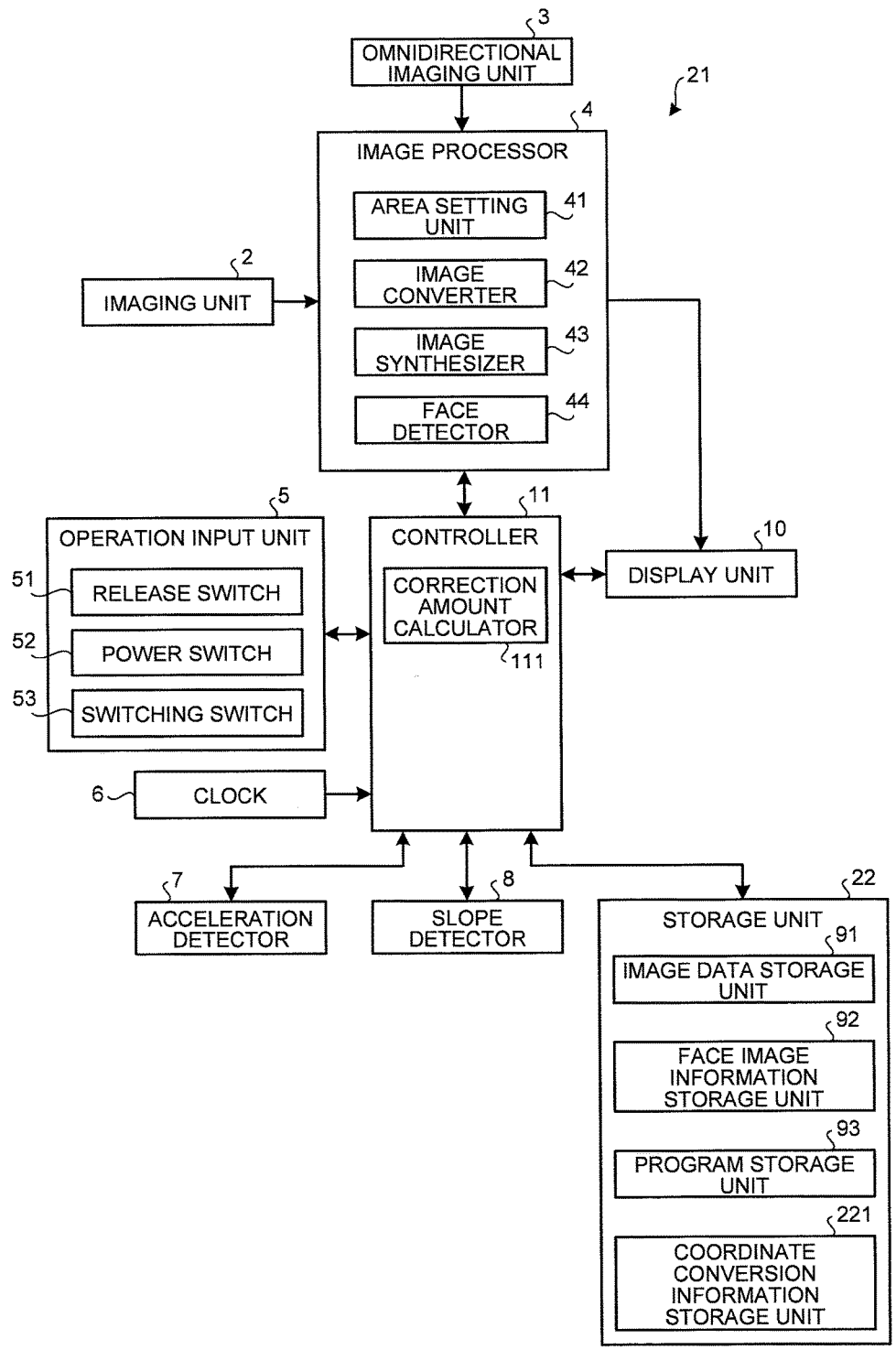
FIG. 22 is a block diagram of a functional configuration of an imaging apparatus according to a second embodiment of the present invention.

FIG. 22 is a block diagram of a functional configuration of the imaging apparatus according to a second embodiment of the present invention. An imaging apparatus 21 in FIG. 22 has a configuration similar to the imaging apparatus 1 excluding a storage unit 22. The storage unit 22 includes, in addition to the image data storage unit 91, the face image information storage unit 92, and the program storage unit 93, a coordinate conversion information storage unit 221 that stores coordinate conversion information about pixels that is used when generating conversion image data from a cut area.

The coordinate conversion information storage unit 221 stores the relation between the pixels of a cut area that is generated according to the slope Δθ of the imaging apparatus 1 and the pixels of a rectangular display area that is obtained by converting the cut area. The coordinate conversion information storage unit 221 does not necessarily store the relation between all the pixels of the cut area and those of the rectangular display area. It suffices that the coordinate conversion information storage unit 221 store the relation between representative pixels of the cut area and those of the rectangular display area.

Figure 23:
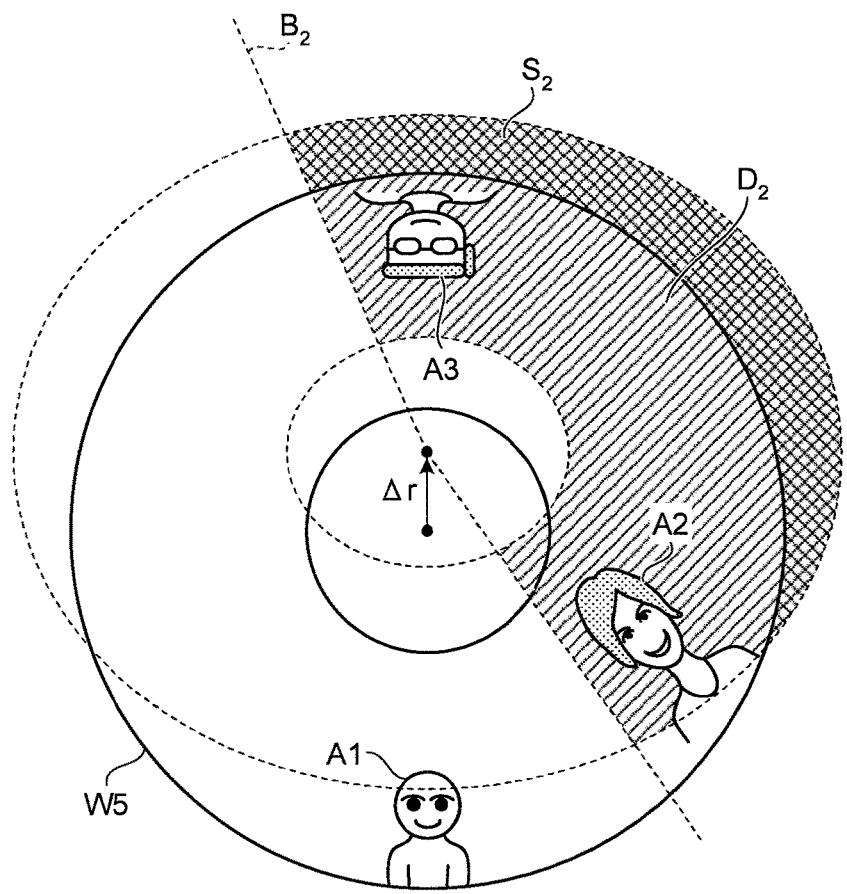
FIG. 23 is a diagram illustrating an overview of a cut area setting process that is performed by an area setting unit of the imaging apparatus according to the second embodiment of the present invention.

FIG. 23 is a diagram illustrating an overview of a cut area setting process performed by the area setting unit 41 of the imaging apparatus 21 according to the second embodiment. As illustrated in FIG. 23, according to a correction amount Δr calculated by the correction amount calculator 111, the area setting unit 41 sets a virtual elliptical annulus from the annulus that is the display area of the omnidirectional image data W5. The ellipse is not limited to a mathematically-precise ellipse. The ellipse means a diagram having a shape like a pressed circle. The optimum shape of the elliptical annulus depends on the optical system being used. An area overlapping the visual field of the area image data W1 is excluded from the area to be converted in the elliptical annulus, which is set by the area setting unit 41. Thereafter, the maximum area containing all the faces of the persons detected by the face detector 44 is extracted from the remaining area and a cut area $D_2$ is set by providing a border $B_2$ corresponding to the extracted maximum area.

Thereafter, the image converter 42 converts the cut area $D_2$ to a rectangular area by referring to the coordinate conversion information stored in the coordinate conversion information storage unit 221 and thereby generates conversion image data. The image converter 42 displays black on a non-imaged area $S_2$ that is an area having not been imaged by the omnidirectional imaging unit 3 out of the cut area $D_2$. Accordingly, no image is displayed on the non-imaged area $S_2$ when the display unit 10 displays the conversion image data. The conversion image data that is obtained from the omnidirectional image data W5 is similar to the conversion image data W6 in FIG. 19(b). The synthesis image data that is generated using the conversion image data and the area image data is similar to the synthesis image data W7 in FIG. 20(b). In the second embodiment, however, the cut area is a part of the elliptical annulus; therefore, even when the slope Δθ is large, the conversion image data in which the distortion is corrected is displayed.

Figure 24:
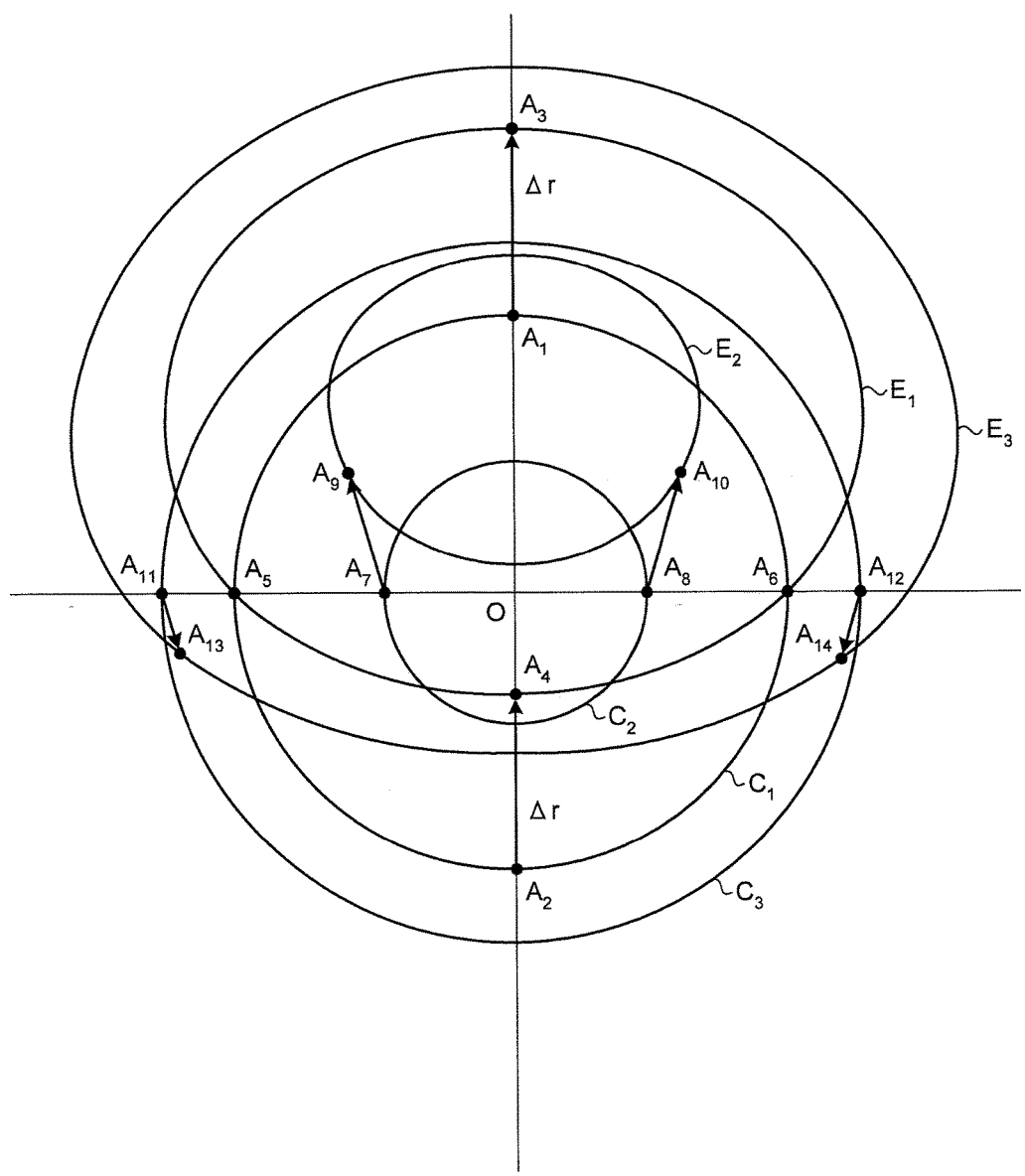
FIG. 24 is a diagram illustrating a change of a cut area of an image according to the equidistant projection method, which is a change made when the imaging apparatus according to the second embodiment of the present invention slopes.

A method of setting a cut area according to the second embodiment will be described in detail below. FIG. 24 is diagram illustrating a change of a cut area of an image according to the equidistant projection method, which is a change made by the optical system when the imaging apparatus 21 according to the second embodiment slopes. FIG. 24 illustrates, as an example, that the slope is 35 degrees and the center of gravity of the image moves upward in FIG. 24 due to the slope.

When the optical axis O of the optical system 30 is parallel to the vertical direction, an image with the elevation angle of 0 degrees with respect to the horizontal direction, i.e., the horizontal image, corresponds to a circle $C_1$ having a radius r and of which center is the center O of the imaging plane. An image with the elevation angle of 40 degrees with respect to the horizontal direction corresponds to a circle $C_2$ having a radius of ((90− 40)/90) and of which center is the center O of the imaging plane. An image with the elevation angle of −20 degrees with respect to the horizontal direction corresponds to a circle $C_3$ having a radius of ((90+20)/90) and of which center is the center O of the imaging plane.

When the imaging apparatus 21 slopes, the horizontal image becomes an ellipse $E_1$ that deforms in the right-left direction in FIG. 24 from the circle $C_1$. Similarly, the images corresponding to the circles $C_2$ and $C_3$ become ellipses $E_2$ and $E_3$, respectively. The ellipses here are not limited to mathematically-precise ellipses. The ellipse means a diagram having a shape like a pressed circle. The amount Δr of movement in the upward-downward direction in FIG. 24 is similar to that obtained by Equation (1) represented above and is represented by (Δθ/90)·r=(35/90)·r. In contrast, the center positions in the right and left directions in FIG. 24 do not change, but the image moves according to the slope. In FIG. 24, the movement directions and the movement amounts at the representative six points are represented by the six arrows. In the horizontal image, the movement direction passes through the center O of the imaging plane of the horizontal image and, because of the slope of the imaging apparatus 21, the center positions (points $A_1$ and $A_2$) in the back and forward directions (the upward and downward directions in FIG. 24) move by a correction amount Δr (point $A_1$→point $A_3$, point $A_2$→point $A_4$). In the horizontal image, a change because of the slope of the imaging apparatus 21 is not caused in the center positions (points $A_5$ and $A_6$) in the right and left directions. The center positions (points $A_7$ and $A_8$) in the right and left directions in the image with an elevation angle of 40 degrees with respect to the horizontal direction move rightward and leftward with respect to the direction in which the center of gravity of the image moves (point $A_7$→point $A_9$, point $A_8$→point $A_{10}$). The center positions (points $A_{11}$ and $A_{12}$) in the right and left directions in the image with an elevation angle of −20 degrees with respect to the horizontal direction move in directions approximately opposite to the direction in which the center of gravity of the image moves due to the slope (point $A_{11}$→point $A_{13}$, point $A_{12}$→point $A_{14}$).

Figure 25:
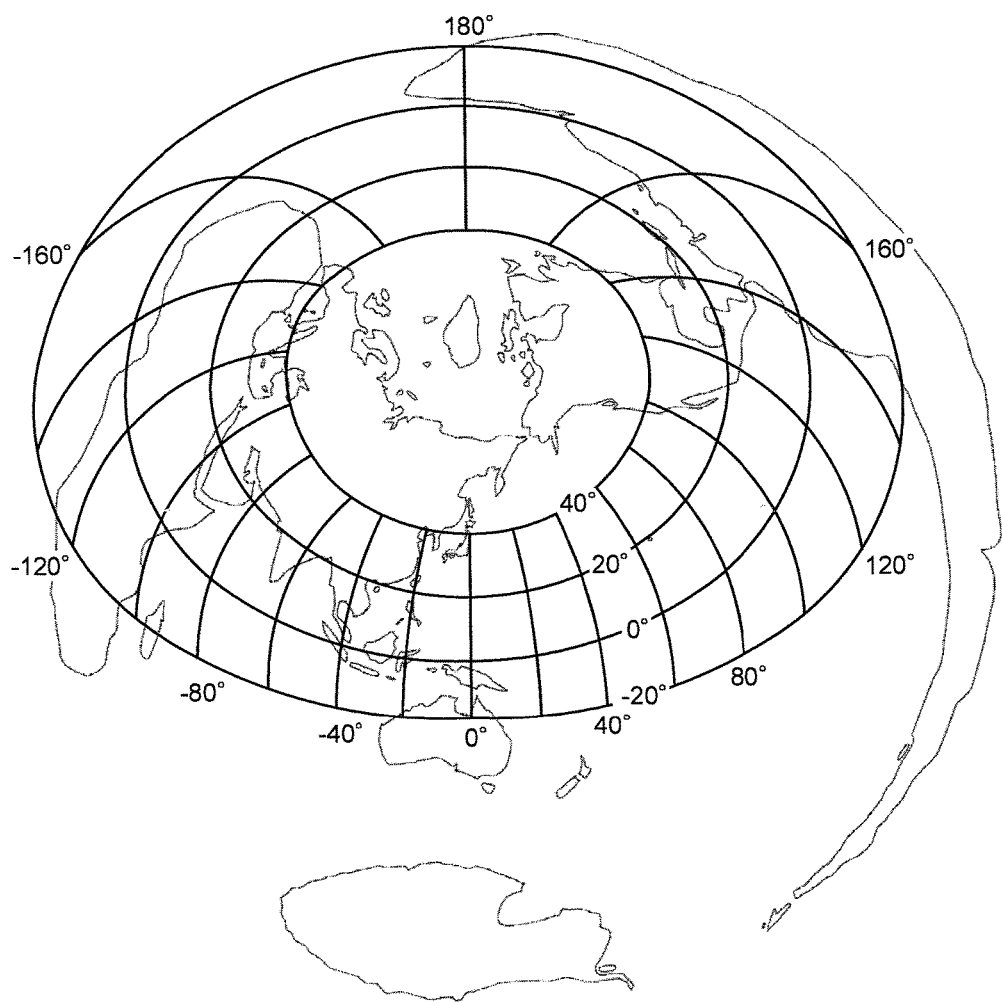
FIG. 25 is a diagram illustrating a cut area using the azimuthal equidistant projection.

The relation between the elevation angle and the horizontal rotation angle according to the equidistant projection method, which is the premise here, coincide with the relation between the longitude and the latitude in the azimuthal equidistant projection that is employed for world maps. FIG. 25 is a diagram illustrating an example of a cut area based on a diagram of the azimuthal equidistant projection. More specifically, FIG. 25 is a diagram illustrating a cut area obtained when the North Pole slopes by 35 degrees in a world map of the azimuthal equidistant projection. The cut area in FIG. 25 is of the area of an elevation angle of −20 to 40 degrees with respect to the horizontal direction. The scale of the cut area is displayed as the rotation angle and the elevation angle with respect to the horizontal surface by each 20 degrees. In FIG. 25, while the elevation angle of 0 corresponding to the horizontal direction with respect to the ground corresponds to the equator, the elevation angle 90 degrees corresponds to the North Pole.

Figure 26:
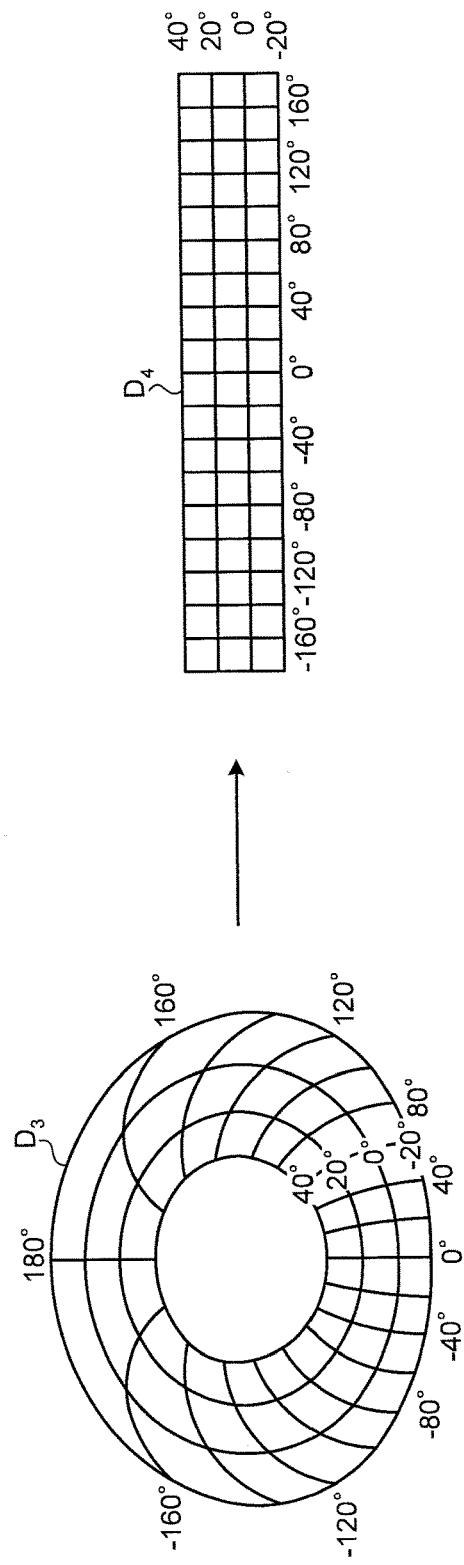
FIG. 26 is a diagram illustrating an overview of a process in which the imaging apparatus according to the second embodiment of the present invention converts the cut area and thereby generates conversion image data.

FIG. 26 is a diagram illustrating an overview of an image conversion process for generating conversion image data by converting a cut area that is cut as described above. More specifically, FIG. 26 is a diagram illustrating the overview of the image conversion process performed when the slope Δθ of the imaging apparatus 21 is 35 degrees under the environment same as that illustrated in FIG. 16. In this case, the area setting unit 41 sets a cut area in the range of the elevation angle of −20 to 40 degrees with respect to the horizontal direction. The image converter 42 refers to the coordinate conversion information stored in the coordinate conversion information storage unit 221, forms a rectangular display area $D_4$ by developing the cut area, and sets the pixel value of each pixel in the cut area $D_3$ for the pixel value of the corresponding pixel in the display area $D_4$, thereby generating conversion image data. When an image formed on the imaging device via the optical system 30 is converted, because an image of the cut area $D_3$ viewed from the opposite side in FIG. 26 is formed (see FIG. 23), the image converter 42 has to perform a conversion for inverting the cut area depending on the optical system being used. In addition, it is also possible to generate conversion image data after cutting a part of an elliptical annulus as illustrated in FIG. 23.

Figure 27:
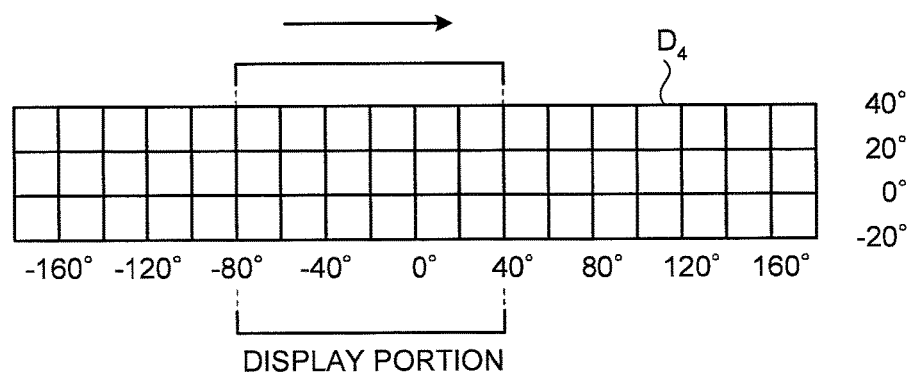
FIG. 27 is a diagram illustrating that, while displaying only a part of the conversion image data, the imaging apparatus according to the second embodiment of the present invention scrolls the image data.

In the case illustrated in FIG. 23, the cut area is a part of the elliptical annulus. However, when conversion image data is generated by converting the whole cut area as illustrated in FIG. 26, the image becomes horizontally long and the image displayed on the display unit 10 may be too small. For this reason, when synthesizing and displaying conversion image data, the conversion image data may be scrolled appropriately when displayed on the display unit 10. In this case, similar to the first embodiment, no image is displayed on a non-imaged area and black is displayed on the non-imaged area. Accordingly, even if the slope $\Delta\theta$ is large, the conversion image data in which the distortion is corrected is displayed. In FIG. 27, the horizontal angle of view of the display portion is 120 degrees. Alternatively, a different angle may be set.

According to the above-described second embodiment of the present invention, similar to the first embodiment, even when the imaging apparatus 1 that slopes captures an omnidirectional image, an easy-to-see display can be realized.

According to the second embodiment, the shape of a cut area of an image is an elliptical annulus according to the slope and conversion image data is generated by converting the cut area. Thus, even if the slope is large, conversion image data in which a distortion is corrected can be obtained.

Figure 28:
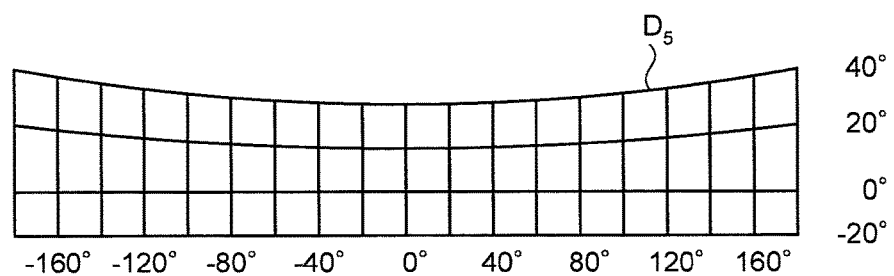
FIG. 28 is a diagram of a display area (second example) of conversion image data that is generated by the imaging apparatus according to the second embodiment of the present invention by converting the cut area.
Figure 29:
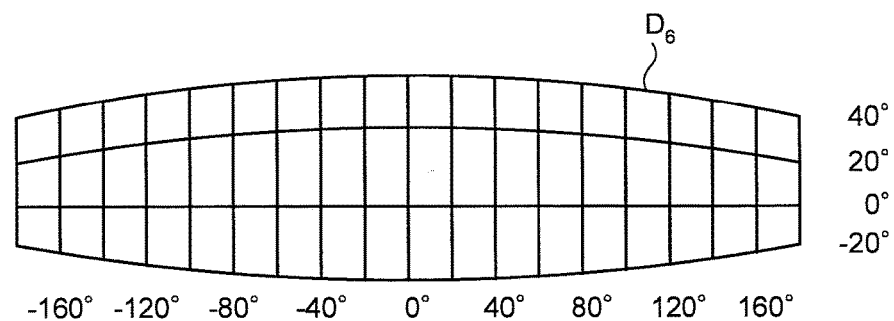
FIG. 29 is a diagram of a display area (third example) of conversion image data that is generated by the imaging apparatus according to the second embodiment of the present invention by converting the cut area.

As conversion image data, as illustrated in FIGS. 28 and 29, the coordinates of the cut area $D_3$ may be converted such that, while the portion of the elevation angle of 0 degrees is converted to be straight, the upper end and the bottom end are longer than the display of the elevation angle of 0 degrees. In the display area $D_5$ illustrated in FIG. 28, the area of the display area increases as the longitude becomes away from the gratitude (0 degree) at the center on the imaging surface of the imaging apparatus 21. In contrast, in a display area $D_6$ illustrated in FIG. 29, the area of the display area decreases as the longitude becomes away from the gratitude (0 degree) at the center on the imaging surface of the imaging apparatus 21. By performing such coordinate conversion, more three-dimensional conversion image data can be generated.

The present invention is not limited to the above-described two embodiments. For example, while the processes of the first embodiment are performed when the value of the slope $\Delta\theta$ is less than a predetermined threshold $\Theta$, the processes of the second embodiment may be performed when the value of the slope $\Delta\theta$ is equal to or more than the predetermined threshold $\Theta$. Accordingly, while a load of calculation is not applied for an area with a small slope, conversion image in which a distortion is corrected can be generated for an area with a large slope. It is assumed that the value of the threshold $\Theta$ is, for example, about 10 degrees.

In the first and second embodiments, it is not necessary to set a cut area using, as a premise, the equidistant projection method. For example, a method may be employed in which projection in the vertical direction is performed with the relation between the intervals between points being maintained while projection same as the equidistant projection method is employed for the horizontal direction. Also in this case, the center of gravity of an image moves according to the slope of the imaging apparatus 21 and the image slopes in the right and left directions orthogonal to the direction in which the center of gravity moves. Thus, the tendency of image distortion is similar to that obtained when the equidistant projection method is applied. In this case, not like the equidistant projection method, the difference in the light receiving area does not increase as the elevation angle increases. This leads to an advantage that deviation in brightness and resolution can be made small easily.

Third Embodiment

Figure 30:
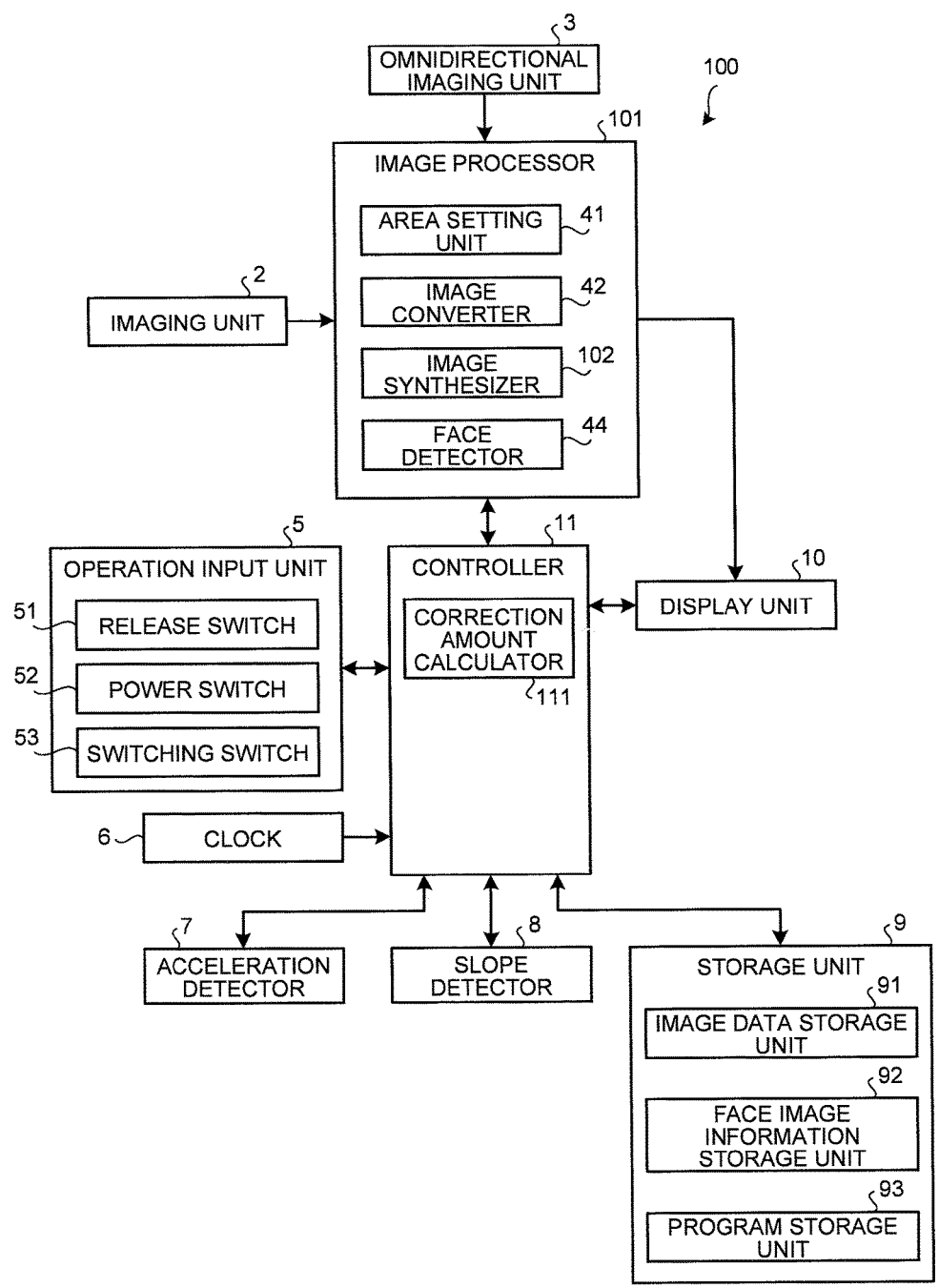
FIG. 30 is a block diagram of a functional configuration of an imaging apparatus according to a third embodiment of the present invention.

FIG. 30 is a block diagram of a functional configuration of an imaging apparatus according to a third embodiment of the present invention. An imaging apparatus 100 in FIG. 30 has a configuration similar to that of the imaging apparatus 1 excluding an image processor 101. The image processor 101 includes, in addition to the area setting unit 41, the image converter 42, and the face detector 44, an image synthesizer 102 that synthesizes conversion image data that is generated by the image converter 42 and image data that is generated by the imaging unit 2 and thereby generates synthesis image data.

Figure 31:
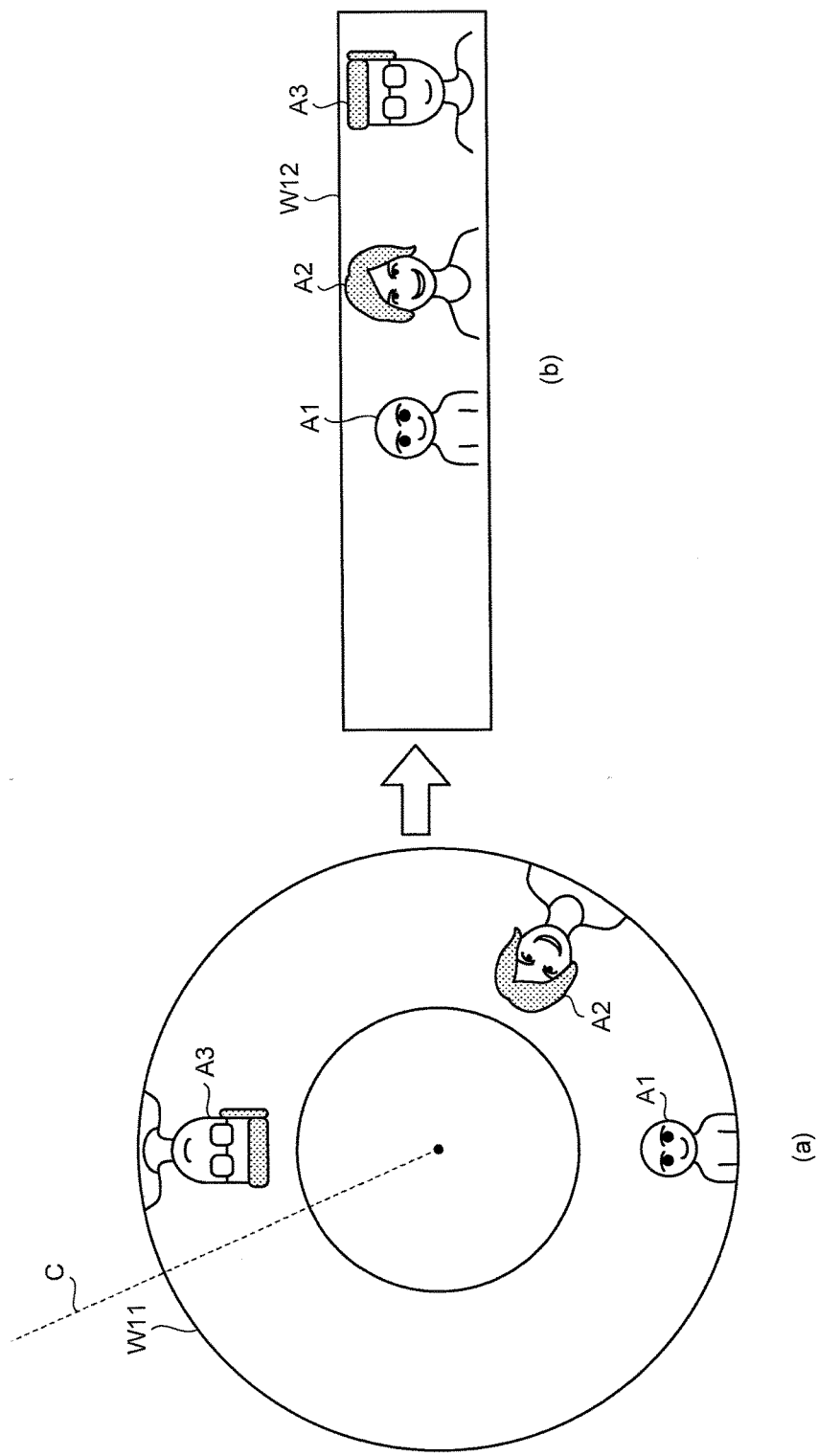
FIG. 31 is a diagram illustrating an overview of a process performed by an image converter under the environment illustrated in FIG. 9.

FIG. 31 is a diagram illustrating an overview of a process that is performed by the image converter 42 under the environment illustrated in FIG. 9. More specifically, FIG. 31 is a diagram illustrating an overview of a process for converting omnidirectional image data that is generated by the omnidirectional imaging unit 3 under the environment illustrated in FIG. 9 and thereby generating conversion image data. The image converter 42 converts the display area of omnidirectional image data W11 and thereby generates conversion image data W12 having a rectangular display area. The image converter 42 sets a cut C in a predetermined position in the omnidirectional image data W11 (FIG. 31(*a*)) and then converts the display area into a rectangular shape, thereby generating the conversion image data (FIG. 31(*b*)). In the case illustrated in FIG. 31(*a*), the cut C is set near the object A3. The position in which the cut C is set is not limited to the position in FIG. 31(*a*). The image converter 42 may have a function of arranging objects with balance by changing the intervals between neighboring objects.

Figure 32:
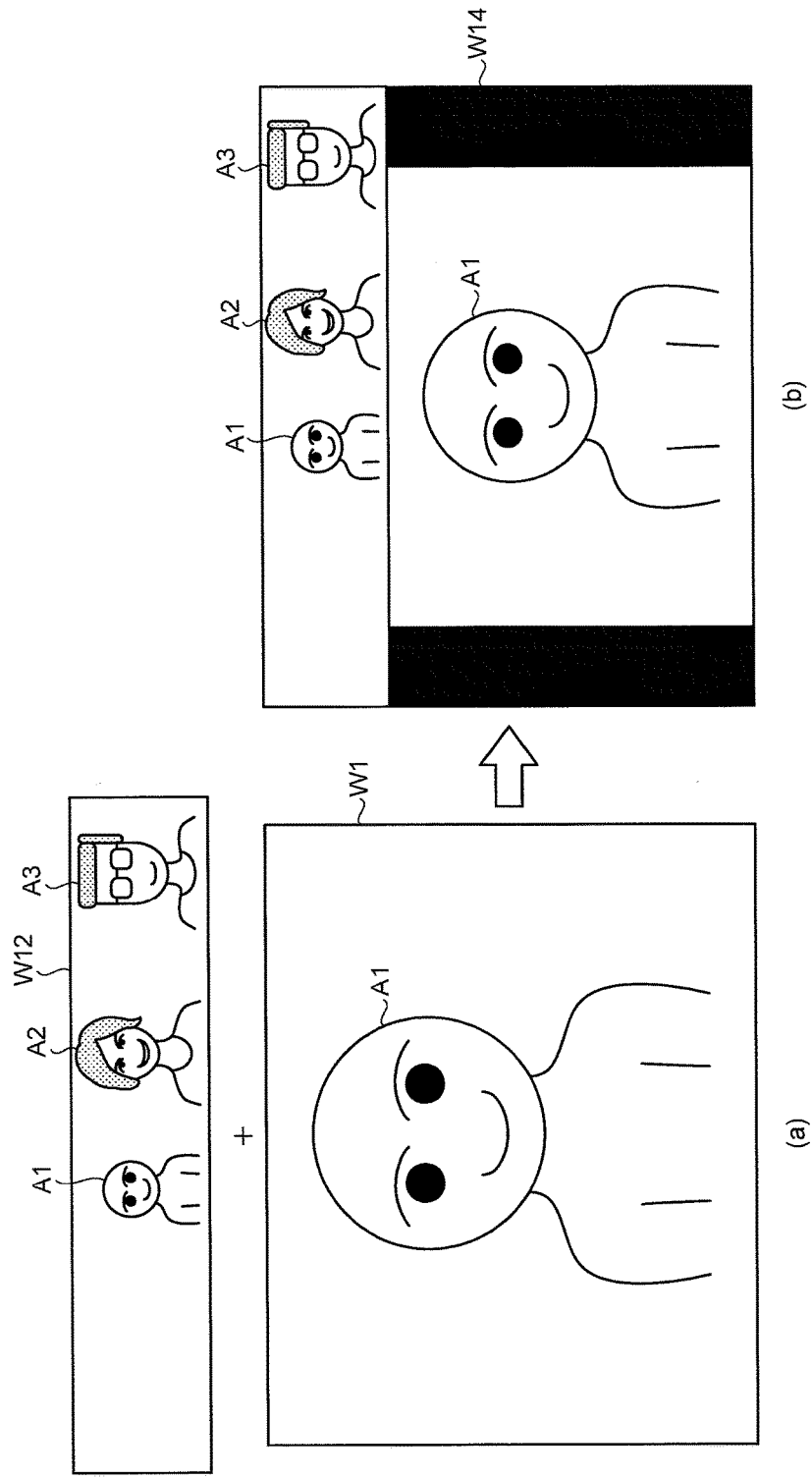
FIG. 32 is a diagram illustrating an overview of a process that is performed by an image synthesizer according to image data of a captured image under the environment illustrated in FIG. 9.

FIG. 32 is a diagram illustrating an overview of a process performed by the image synthesizer 102 according to the image data of an image captured under the environment illustrated in FIG. 9. More specifically, FIG. 32 is a diagram illustrating an overview of a process for synthesizing the conversion image data W12, which is generated by the image converter 42, and the area image data W1, which is generated by the imaging unit 2, under the environment illustrated in FIG. 9 and thereby generating synthesis data. The image synthesizer 102 reduces the sizes of the area image data W1 and the conversion image data W12 shown in FIG. 32(*a*) while keeping the aspect ratio and arranges the size-reduced conversion image data W12 above the size-reduced area image data W1, thereby generating synthesis data W14 (FIG. 32(*b*)). The ratio of the vertical length of the display area of the area image data W1 to the vertical length of the display area of the conversion image data W12 may be appropriately set by an input from the switching switch 53. The conversion image data W12 may horizontally run off the screen; therefore, for example, it is more preferable that the display area of the conversion image data W12 be selected via the operation input unit 5. The image synthesizer 102 may arrange the conversion image data W12 below the area image data W1.

Figure 33:
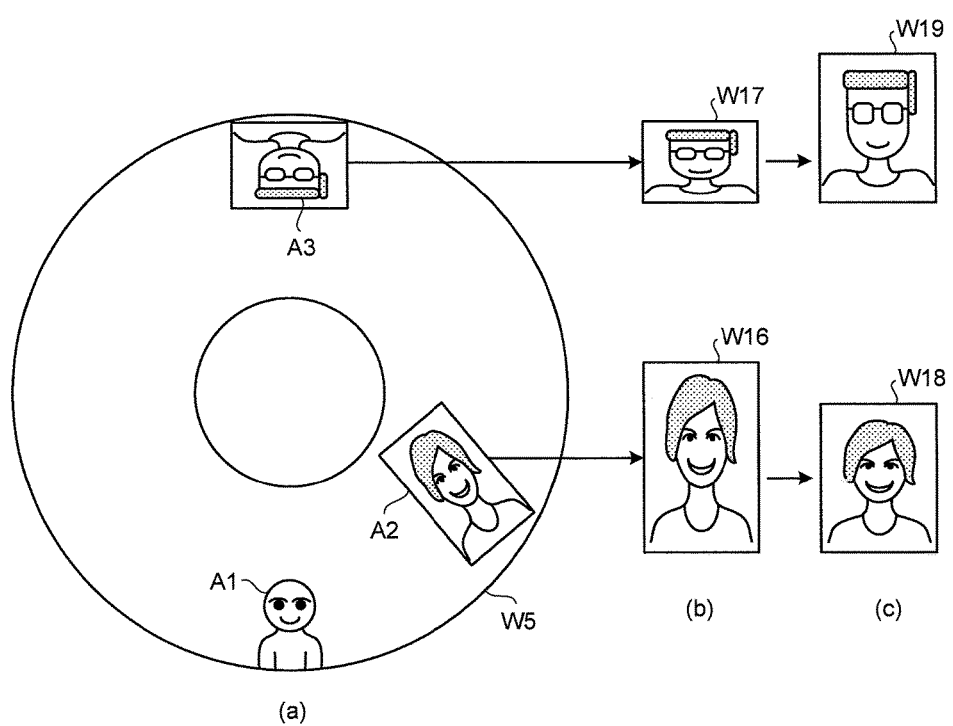
FIG. 33 is a diagram illustrating an overview of a process that is performed by the image converter on captured omnidirectional image data under the environment illustrated in FIG. 15.

FIG. 33 is a diagram illustrating an overview of a process performed by the image converter on omnidirectional image data of an image captured under the environment illustrated in FIG. 15. When the imaging apparatus determines that the optical axis P of the imaging unit 2 is not horizontal according to the result of detection by the slope detector 8, the face detector 44 detects the faces of the persons contained in the omnidirectional image data W5 of an image captured by the omnidirectional imaging unit 3 (FIG. 33(a)).

The image converter 42 then extracts the faces other than the face of the object A1 imaged by the imaging unit 2 (extracts the faces of the objects A2 and A3 in the case illustrated in FIG. 33) out of the faces detected by the face detector 44 (FIG. 33(b)).

The image converter 42 then converts the face image data of the extracted faces and thereby generates conversion image data. Specifically, the image converter 42 corrects at least any one of the size and the slope of the faces in the images of the extracted face image data W16 and W17 and thereby generates conversion image data W18 and W19 each having a rectangular display area (FIG. 33(c)). More specifically, the image converter 42 extracts face image data with high similarity from the face image data of persons facing forward, which is face data stored in the face image information storage unit 92, and generates conversion image data using the extracted face image data. For this reason, the face image information storage unit 92 may store beforehand face image data on specific persons including the objects A1 to A3. In this embodiment, the face image data of the object A1 is excluded from the area to be converted by the image converter 42. However, the face image data of the object A1 may be converted.

Figure 34:
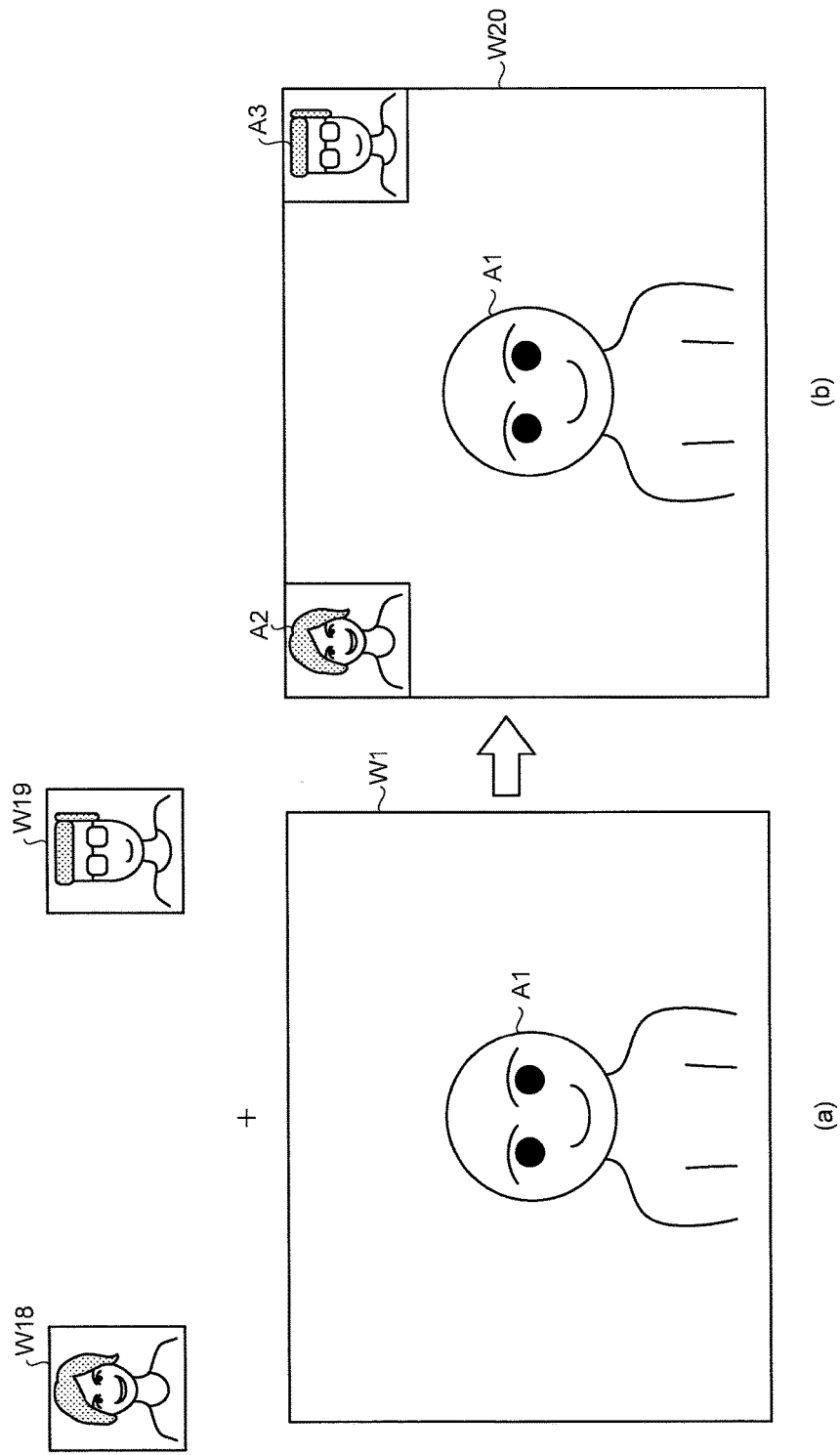
FIG. 34 is a diagram illustrating an overview of a process performed by the image synthesizer under the environment illustrated in FIG. 15.

FIG. 34 is a diagram illustrating an overview of a process performed by the image synthesizer 102 under the environment illustrated in FIG. 15. More specifically, FIG. 34 is a diagram illustrating an overview of a process for synthesizing the conversion image data W18 and W19, which are generated by the image converter 42, and the area image data W1, which is generated by the imaging unit 2, under the environment illustrated in FIG. 15 and thereby generates synthesis image data. The image synthesizer 102 superimposes the image data W18 and W19, of which sizes are reduced or increased to a predetermined size while keeping the aspect ratio, on circumferential left and right upper areas on the display area of the area image data W1 and thereby generates synthesis image data W20 (FIG. 34(b)). By performing such an image synthesis, even if an image of an object captured by the omnidirectional imaging unit 3 deforms due to a change of the posture of the imaging apparatus 1, the image can be converted into a normal state and the normal image can be displayed accordingly. The area of the display area of the synthesized conversion image data may be pre-set or may be changed by an input of the operation input unit 5.

Figure 35:
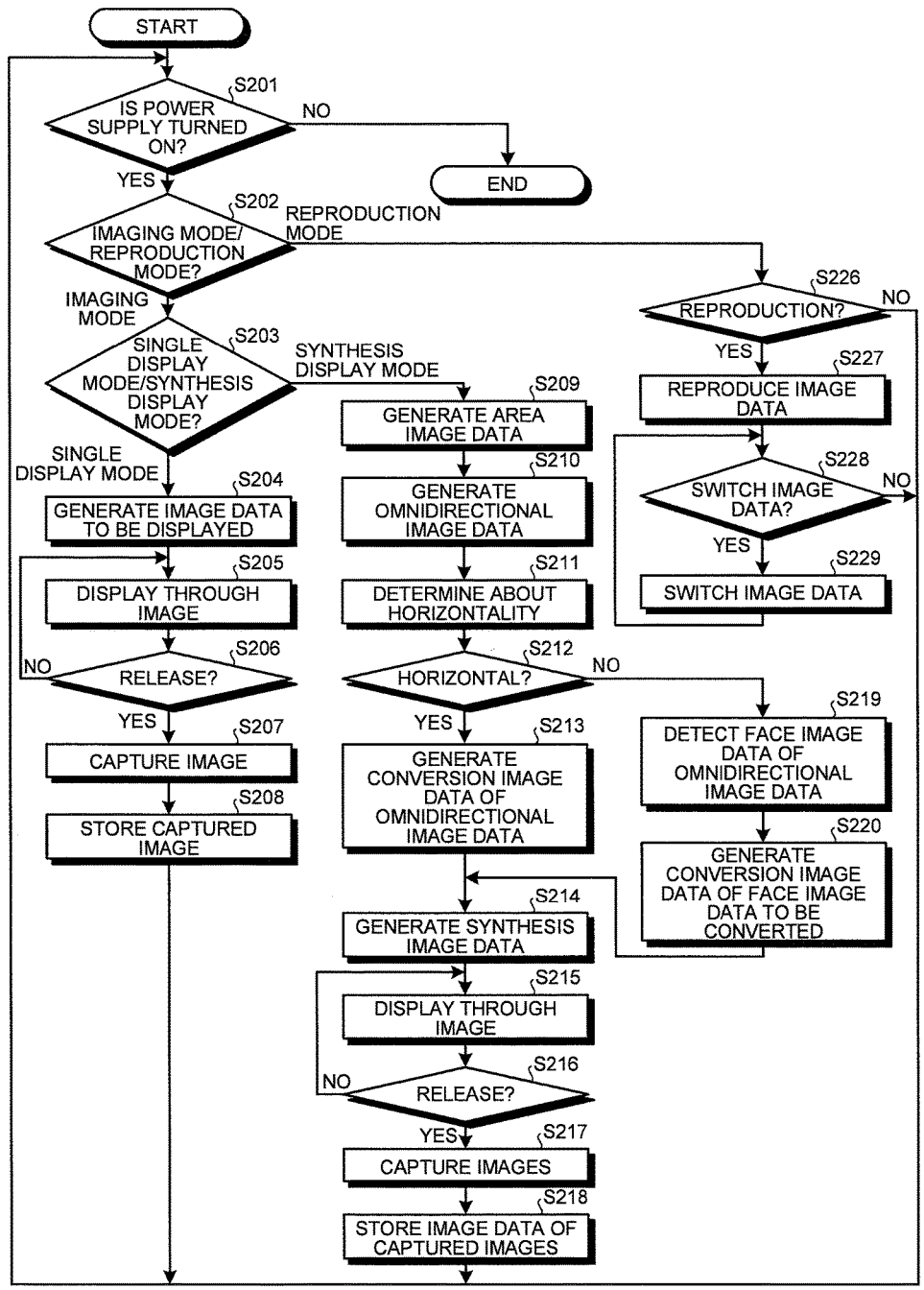
FIG. 35 is a flowchart illustrating an overview of processes that are performed by the imaging apparatus according to the third embodiment of the present invention.

An overview of processes performed by the imaging apparatus 100 will be described below. FIG. 35 is a flowchart of an overview of the processes performed by the imaging apparatus 100. As illustrated in FIG. 35, the controller 11 determines whether the power switch 52 is operated and the power supply of the imaging apparatus 100 is turned on (step S201). When the power supply of the imaging apparatus 100 is not turned on (NO at step S201), the imaging apparatus 100 ends the process. In contrast, when the power supply of the imaging apparatus 100 is turned on (YES at step S201), the imaging apparatus 100 goes to step S202.

The controller 11 then determines whether an imaging mode or a reproduction mode is set (step S202). When the imaging mode is set (imaging mode at step S202), the imaging apparatus 100 goes to step S203. In contrast, when the reproduction mode is set (reproduction mode at step S202), the imaging apparatus 100 goes to step S226.

At step S203, the controller 11 determines whether a single display mode or a synthesis display mode is set in the imaging mode. When the single display mode is set (single display mode at step S203), the imaging apparatus 100 goes to step S204. In contrast, when the synthesis display mode is set (synthesis display mode at step S203), the imaging apparatus 100 goes to step S209.

The case in which the single display mode is set (single display mode at step S203) in the imaging apparatus 100 will be described first. In this case, only the imaging unit that generates image data of which displaying is selected starts and generates image data (step S204). In other words, when displaying area image data of an image captured by the imaging unit 2 is selected, the imaging unit 2 generates area image data. On the other hand, when displaying omnidirectional image data of an image captured by the omnidirectional imaging unit 3 is selected, the omnidirectional imaging unit 3 generates omnidirectional image data.

Thereafter, the display unit 10 displays a live view image of the image data that is generated at step S204 (step S205). When the live view image displayed here is image data generated by the imaging unit 2, for example, it is the area image data W1 shown in FIG. 11. When the live view image displayed here is image data generated by the omnidirectional imaging unit 3, for example, it is the display of the omnidirectional image data W12 in FIG. 12 on the display unit 10 that is rectangular.

The controller 11 then determines whether a release signal is input by an operation of the release switch 51 (step S206). When no release signal is input (NO at step S206), the process goes to step S205. In contrast, when a release signal is input (YES at step S206), the imaging apparatus 100 captures an image displayed as the live view image (step S207).

The imaging apparatus 100 then stores, in the image data storage unit 91, the image data of an image that is captured by the imaging unit 2 or the omnidirectional imaging unit 3 and processed by the image processor 4 (step S208) and goes to step S101.

The case in which the synthesis display mode is set at step S203 (synthesis display mode at step S203) will be described. In this case, the imaging unit 2 generates area image data (step S209) and the omnidirectional imaging unit 3 generates omnidirectional image data (step S210).

The controller 11 determines whether the optical axis P of the imaging unit 2 is horizontal according to time variations of the magnitude of the gravitational acceleration of the imaging apparatus 100, which are detected by the slope detector 8 periodically (step S211). When the imaging apparatus 1 is horizontal (YES at step S212), the imaging apparatus 100 goes to step S213. In contrast, when the imaging apparatus 100 is not horizontal (NO at step S212), the imaging apparatus 100 goes to step S219. When the optical axis P is within a predetermined range containing the horizontal direction, the slope detector 8 outputs a detection signal representing that the imaging apparatus 100 is determined to be horizontal to the controller 11.

At step S213, the image converter 42 converts the whole visual field of the omnidirectional image data of the image, which is captured by the omnidirectional imaging unit 3, to a rectangular image and thereby generates conversion image data (step S213). The process at step S213 corresponds to, for example, the process described above with reference to FIG. 31.

The image synthesizer 102 then synthesizes the area image data and conversion image data generated by the image converter 42 and thereby generates synthesis image data (step S214). The process at step S214 corresponds to, for example, the process described with reference to FIG. 34.

The display unit 10 then displays a live view image of the synthesis image data generated by the image synthesizer 102 (step S215). The displayed live view image here is, for example, the synthesis image data W14 in FIG. 32.

The controller 11 determines whether a release signal is input by an operation of the release switch 51 (step S216). When no release signal is input (NO at step S216), the imaging apparatus 100 returns to step S215. In contrast, when a release signal is input (YES at step S216), the imaging apparatus 100 captures images by the imaging unit 2 and the omnidirectional imaging unit 3 (step S217).

Thereafter, the imaging apparatus 100 stores the area image data generated by the imaging unit 2 and the omnidirectional image data generated by the omnidirectional imaging unit 3 in the image data storage unit 91 (step S218) and then goes to step S201.

At step S219, the face detector 44 detects face image data of the persons from the omnidirectional image data generated by the omnidirectional imaging unit 3 (step S219). Thereafter, the image converter 42 corrects the aspect ratio and the slope of the face image data to be converted, which is face image data detected by the face detector 44, and thereby generates conversion image data (step S220). The process at steps S219 to S220 corresponds to, for example, the process described above with reference to FIG. 33.

After step S220, the imaging apparatus 100 goes to step S214 and synthesizes the area image data and the conversion image data generated by the image converter 42 and thereby generates synthesis image data. The generated synthesis image data is, for example, the synthesis image data W20 in FIG. 34. The imaging apparatus 100 then performs the processes at steps S215 to S218.

The case in which the imaging apparatus 100 is set to the reproduction mode at step S202 (reproduction mode at step S202) will be described. In this case, the controller 11 determines whether a reproduction instruction signal is input from the operation input unit 5 (step S226). When no reproduction instruction signal is input (NO at step S226), the imaging apparatus 100 returns to step S201. In contrast, when a reproduction instruction signal is input (YES at step S226), the display unit 10 reproduces and displays image data specified among the image data stored in the image data storage unit 91 (step S227).

The controller 11 then determines whether a switching signal for switching the image data displayed on the display unit 10 is input by an operation of the switching switch 53 (step S228). When no switching signal is input (NO at step S228), the imaging apparatus 100 returns to step S201. In contrast, when a switching signal is input (YES at step S228), the display unit 10 switches the displayed image data (step S229) and returns to step S228.

According to the above-described third embodiment, the imaging apparatus 100 includes the imaging unit 2 corresponding to an imaging unit of a normal imaging apparatus; the omnidirectional imaging unit 3 images an area all around the axis O orthogonal to the optical axis P of the imaging unit 2; the image converter 42 that converts at least a part of the omnidirectional image data, which is generated by the omnidirectional imaging unit 3, to image data having a rectangular display area; the image synthesizer 102 that synthesizes the conversion image data generated by the image converter 42 and the area image data generated by the imaging unit 2; and the display unit 10 that displays the synthesis image data that is synthesized by the image synthesizer 102. This allows capturing an image of a wider filed that contains, in addition the limited visual field in the vertical and horizontal directions of which image can be captured by a normal imaging apparatus, fields neighboring the visual field and allows collectively displaying the result of the image capturing.

According to the third embodiment, even when the posture of the imaging apparatus 100 changes and the faces of the persons imaged by the omnidirectional imaging unit 3 deform, all the persons around the imaging apparatus 100 can be displayed appropriately by converting the size and the slope of the faces.

Figure 36:
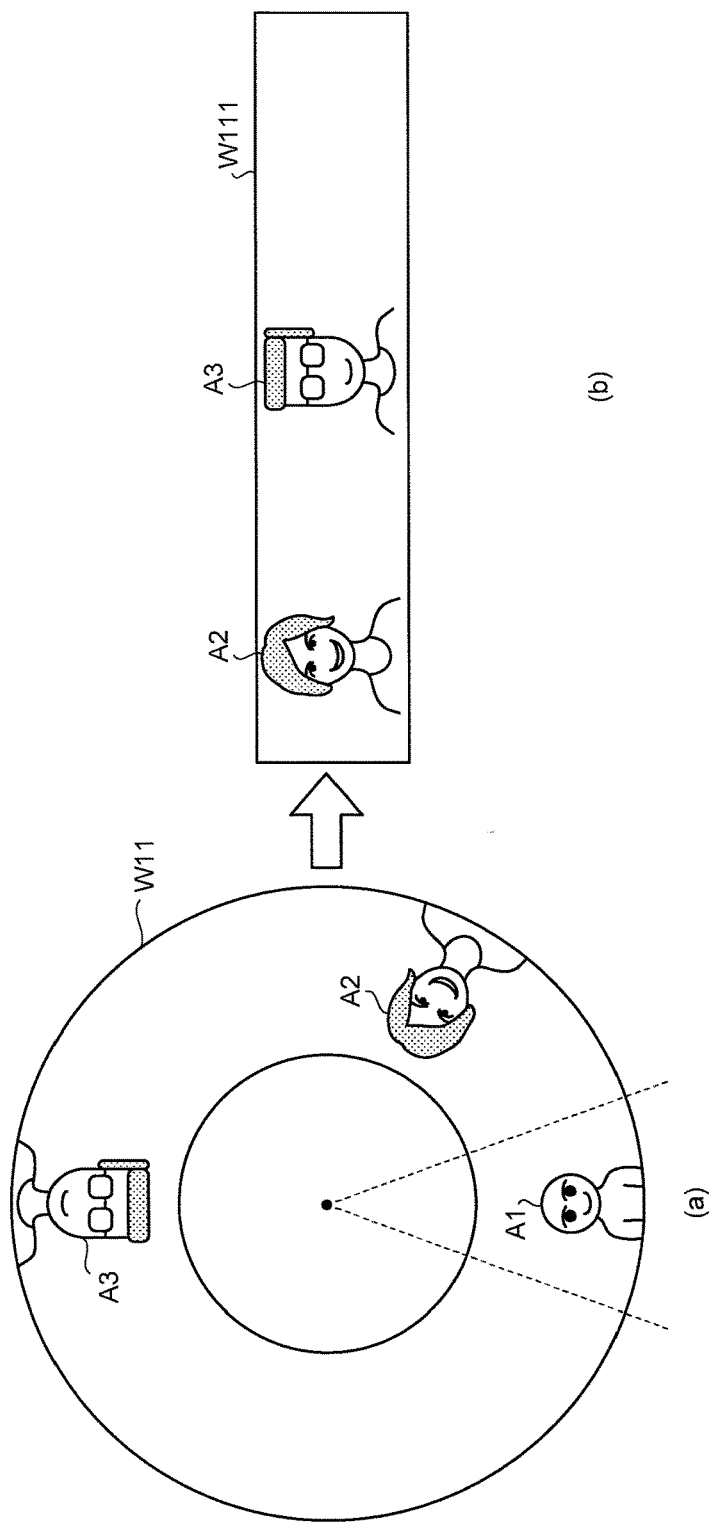
FIG. 36 is a diagram illustrating an overview of a process of an image converter of an imaging apparatus according to a modification of the third embodiment.

FIG. 36 is a diagram illustrating, as a modification of the third embodiment, another example in which conversion image data is generated by converting omnidirectional image data generated by the omnidirectional imaging unit 3 under the environment illustrated in FIG. 9. In the case illustrated in FIG. 36, the image converter 42 excludes a portion overlapping a first visual field in the area image data from a second visual field in the omnidirectional image data W11, i.e., excludes the area containing the object A1 from the area to be converted (FIG. 36(*a*)) and converts the remaining area, thereby generating rectangular conversion image data W111 (FIG. 36(*b*)).

Figure 37:
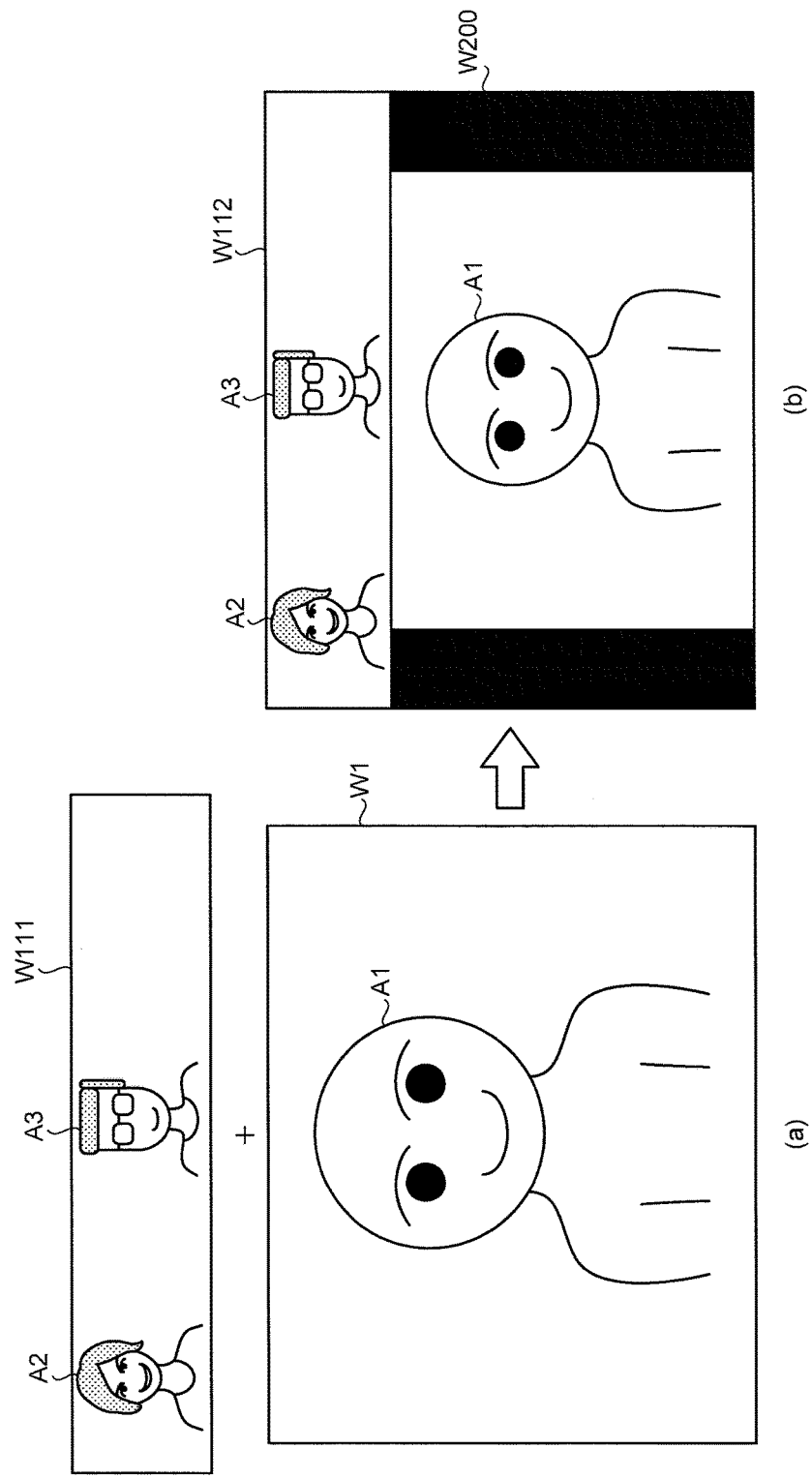
FIG. 37 is a diagram illustrating an overview of a process of an image synthesizer of the imaging apparatus according to the modification of the third embodiment.

FIG. 37 is a diagram illustrating that the image synthesizer 102 synthesizes the conversion image data W111, which is generated by the image converter 42, and the area image data W1 and thereby generates synthesis image data. The image synthesizer 102 reduces the size of the area image data W1 and the conversion image data W111 and arranges the size-reduced conversion image data W112 above the size-reduced area image data W1, thereby generating synthesis image data W200 (FIG. 37(*b*)).

According to the modification of the third embodiment, synthesis image data in which the same object is not overlapped is displayed can be generated.

A configuration may be employed in which a setting for the image converter 42 to determine whether image conversion is performed on the omnidirectional image data excluding the portion overlapping the area image data is made by an operation of the operation input unit 5.

Figure 38:
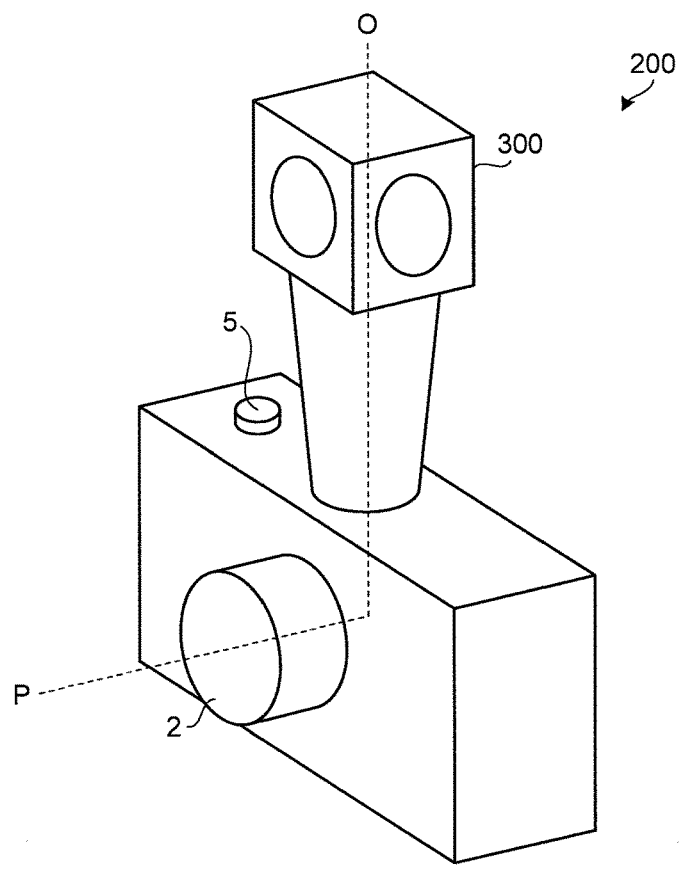
FIG. 38 is a perspective view of a front configuration of an imaging apparatus according to a modification of the third embodiment.

FIG. 38 is a perspective view of a front configuration of an imaging apparatus according to another example of the third embodiment. In FIG. 38, components having the same configurations as those of the imaging apparatus 1 are denoted by the reference numerals the same as those for the imaging apparatus 1. An imaging apparatus 200 illustrated in FIG. 38 includes the imaging unit 2 and an omnidirectional imaging unit 300.

Figure 39:
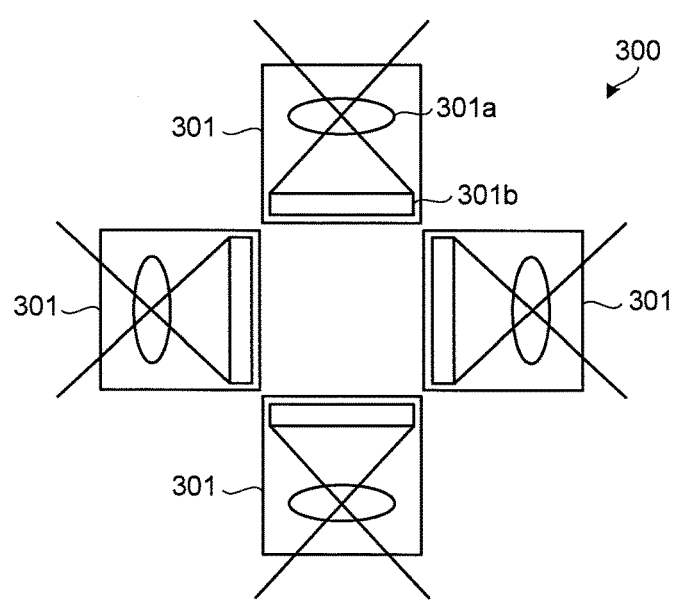
FIG. 39 is a schematic diagram of a configuration of an omnidirectional imaging unit of the imaging apparatus according to the modification of the third embodiment.

FIG. 39 is a schematic diagram of a configuration of the omnidirectional imaging unit 300. The omnidirectional imaging unit 300 includes four imaging units 301 of which visual fields each exceed at least 90 degrees. The imaging unit 301 has a configuration similar to that of the imaging unit 2. The imaging unit 301 includes an optical system 301*a*, an imaging device 301*b*, an aperture, and a shutter. In FIG. 39, the optical system 301*a* is simply described and descriptions for the aperture and the shutter are omitted.

The imaging apparatus 200 having the above-described configuration can simultaneously capture images of second visual fields all around the axis O orthogonal to the optical axis P of the imaging unit 2, thereby realizing the same effects as those realized by the imaging apparatus 1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
a first imaging unit including (1) a system of one or more lenses defining an optical axis and (2) an image pickup unit, the first imaging unit capturing a visual field all around the optical axis of the first imaging unit and generating image data of the captured visual field as omnidirectional image data, wherein the omnidirectional image data forms an annular shape;
a second imaging unit including (1) a system of one or more lenses defining an optical axis orthogonal to the optical axis of the first imaging unit and (2) an image pickup unit, wherein
a first optical path defined by the system of one or more lenses of the first imaging unit has no overlap with a second optical path defined by the system of one or more lenses of the second imaging unit,
the first imaging unit is positioned outside of any angle of view of the second imaging unit,
the first imaging unit is configured to capture the image in both of a front direction and a back direction with respect to the imaging apparatus, and
an image converter that converts at least a part of the omnidirectional image data, which is generated by the first imaging unit, to image data having a display area and thereby generates conversion image data;
a display unit that displays an image corresponding to the conversion image data, which is generated by the image converter; and
an image synthesizer that synthesized area image data, which is generated by the second imaging unit, and the conversion image data, which is generated by the image converter, and thereby generates synthesis image data, wherein the display unit displays an image corresponding to the synthesis image data.

2. The imaging apparatus according to claim 1, wherein the second imaging unit captures and generates, as the area image data, an image of a visual field with an angle of view of two directions that are orthogonal to each other on the optical axis, the angle of view being less than 180 degrees.

3. The imaging apparatus according to claim 2, wherein the image converter excludes an area that is an overlap of the visual field of the first imaging unit and the visual field of the second imaging unit, from an area to be converted.

4. The imaging apparatus according to claim 3, wherein the image synthesizer arranges the omnidirectional image data and the area image data one above the other.

5. The imaging apparatus according to claim 3, wherein the image synthesizer superimposes the conversion image data, which is converted by the image converter, on a circumferential area of the area image data.

6. The imaging apparatus of claim 1 wherein the imaging apparatus is capable of being hand held.

7. The imaging apparatus of claim 1 wherein the system of one or more lenses of the first imaging unit and the system of one or more lenses of the second imaging unit have no shared components.

8. The imaging apparatus of claim 1 further comprising a housing including the first imaging unit and the second imaging unit, wherein first light flux enters the housing via a lens of the first imaging unit and second light flux enters the housing via a lens of the second imaging unit, and wherein the lens of the first imaging unit is different from the lens of the second imaging unit.

9. The imaging apparatus of claim 8 wherein the lens of the first imaging unit is located on the housing, and wherein the lens of the second imaging unit is located on the housing at a different position than that of the lens of the first imaging unit.

\* \* \* \* \*